United States Patent
Ahn

(10) Patent No.: US 9,800,618 B1
(45) Date of Patent: *Oct. 24, 2017

(54) USER AGENT TO EXERCISE PRIVACY CONTROL MANAGEMENT IN A USER-CENTRIC IDENTITY MANAGEMENT SYSTEM

(71) Applicant: OPEN INVENTION NETWORK LLC, Durham, NC (US)

(72) Inventor: Gail-Joon Ahn, Phoenix, AZ (US)

(73) Assignee: Open Invention Network LLC, Durham, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/149,980

(22) Filed: May 9, 2016

Related U.S. Application Data

(63) Continuation of application No. 14/450,436, filed on Aug. 4, 2014, now Pat. No. 9,338,188, which is a continuation of application No. 12/472,511, filed on May 27, 2009, now Pat. No. 8,799,984.

(60) Provisional application No. 61/056,249, filed on May 27, 2008.

(51) Int. Cl.
 *H04L 29/06* (2006.01)

(52) U.S. Cl.
 CPC .............. *H04L 63/20* (2013.01); *H04L 63/08* (2013.01); *H04L 67/42* (2013.01)

(58) Field of Classification Search
 CPC ...... G06F 21/34; G06F 21/6263; H04L 63/20; H04L 63/102; H04L 67/42; H04L 63/08
 See application file for complete search history.

(56) References Cited

U.S. PATENT DOCUMENTS

| | | | |
|---|---|---|---|
| 8,799,984 B2 * | 8/2014 | Ahn | G06F 21/34 713/164 |
| 9,338,188 B1 * | 5/2016 | Ahn | G06F 21/34 |
| 2007/0192838 A1 * | 8/2007 | Laitinen | H04L 63/08 726/4 |

\* cited by examiner

Primary Examiner — Mohammad A Siddiqi
(74) Attorney, Agent, or Firm — Haynes and Boone, LLP

(57) ABSTRACT

A client-side user agent operates in conjunction with an identity selector to institute and exercise privacy control management over user identities managed by the identity selector. The user agent includes the combination of a privacy enforcement engine, a storage of rulesets expressing user privacy preferences, and a preference editor. The editor enables the user to direct the composition of privacy preferences relative to user identities. The preferences can be applied to individual cards and to categorized groups of attributes. The engine evaluates the proper rulesets against the privacy policy of a service provider. The privacy preferences used by the engine are determined on the basis of specifications in a security policy indicating the attribute requirements for claims that purport to satisfy the security policy.

20 Claims, 20 Drawing Sheets

Prototype of the preference editor over the card

University of North Carolina at Charlotte

Card Image

Card Name

Privacy Preferences (Generic)

- Information shared with the third party for marketing and analysis

Prompt? [ ] yes [ ] no

- Information shared to determine habits, Interests or characteristics

Prompt? [ ] yes [ ] no

- etc

The Laboratory of Information Integration, Security and Privacy (LIISP)

Slide 74

FIG. 5

Preference Matrix

*University of North Carolina at Charlotte*

| | Purpose | Access | Recipient | Retention | Disputes | Remedies |
|---|---|---|---|---|---|---|
| STRICT | current, admin, develop, pseudo-analysis | All the data "MUST" | Requestor only | Stated purpose, legal requirements by requestor "ONLY" | customer service, law, independent organization | Correct the mistake, law agencies |
| CAUTIOUS | + tailoring, individual decision, individual analysis, contact | Contact information and identify information "MUST" | Requestors and their trusted business partners CLAUSE: (business partners cannot contact me) | -Same as above- | -Same as above- | -Same as above- |
| MODERATE | + telemarketing | -Same as above- | + CLAUSE: (Business partners can contact me for promotions of their products) | -Same as above- | -Same as above- | -Same as above |
| FLEXIBLE | -Same as above- | Contact information "AT LEAST" | + Un-trusted business partners | + Un-trusted business partners can also keep the data | Independent organization "ONLY" | Law "ONLY" |
| CASUAL | -Same as above- | "MAY" not have access to any information that you collect | + Unrelated entities | Anyone "CAN" keep my data indefinitely | -Same as above- | -Same as above |

The Laboratory of Information Integration, Security and Privacy

FIG. 9

Demo - Requirements in Interaction

University of North Carolina at Charlotte

| Interaction | Entity | Required Functions | Possible Technologies |
|---|---|---|---|
| 1. Access to Resource<br>2. Request Claim | User (Identity Selector: IS) | - connect the SP services | -Browser<br>-Client Application (Web Service) |
| | | - Verifying the SP : it is the correct SP which user wants to connect | -certificate<br>-Site key |
| | | - Understanding the SP's request claims for authentication | -WS-MetadataExchange |
| | RP | - Providing RP service to user | -Web Service<br>-Web Server |
| | | - Providing RP's authentication specification | -WS-SecurityPolicy<br>-Claim Tags |
| | | - Providing authentication methods | -ID/Password<br>-Kerberos<br>-SAML<br>-X.509 |
| | | - Providing for confidentiality and integrity | -SSL<br>-XML signature<br>-Security key/ public key |
| | | - Providing RP's certificate | -WS-addressing |
| | | - Verifying the user machine | -Site key |

The Laboratory of Information Integration, Security and Privacy (LIISP)

FIG. 15

Demo - Requirements in Interaction

| Interaction | Entity | Required Functions | Possible Technologies |
|---|---|---|---|
| 3. P3P Parser | User (IS) | - Parse P3P Lite policy of RP and match against users PREP-make decisions and give alerts to the user | -P3P Parser Matching engine Prep editor |
| 4. Select InfoCard | User (IS) | - InfoCard Management (Create, delete, edit, import, export, and view) | -Identity Selector |
| | | - Verifying the SP : it is the correct SP which user wants to connect | -certificate |
| | | - Filtering function for InfoCard | -DOM, XML |
| | | - Audit: review the history of card usage | |
| | | - connect the IdP services | -Identity Selector |
| | User (IS) | - Understanding the authentication method of IdP | -WS-MetadataExchange |
| | | - Verifying the IdP : it is the correct IdP which user wants to connect | -Certificate<br>-Site key |
| | | - Providing IdP's authentication specification | -WS-SecurityPolicy |
| 5. Authentication | IdP | - Providing for confidentiality and integrity of communication data | -SSL<br>-XML signature<br>-Security key/ public key |
| | | - Providing IdP's certificate | -WS-addressing |
| | | - Providing Authentication methods | -ID/Password<br>-Kerberos<br>-SAML<br>-X.509 |

FIG. 16

University of North Carolina at Charlotte

Demo - Requirements in Interaction

| Interaction | Entity | Required Functions | Possible Technologies |
|---|---|---|---|
| | User (Identity Selector) | - connect the IdP services | -Identity Selector<br>-Browser<br>-Client application |
| | | - Verifying the IdP : it is the correct IdP which user wants to connect | -certificate<br>-Site key |
| 6. Request a Token<br>7. Issue a Token | | - Request/receive a token | -WS-Trust |
| | IdP | - Providing STS service | -WS-Trust |
| | | - Providing for confidentiality and integrity | -SSL<br>-XML signature<br>-Security key/ public key |
| | User (Identity Selector) | request user consent to submit a token to RP | -Identity Selector |
| | | -submit a token | -SAML |
| 8. Submit a Token | RP | -Verification function for a token | -XML signature |
| | | - Providing for confidentiality and integrity | -SSL<br>-XML signature<br>-Security key/ public key |

The Laboratory of Information Integration, Security and Privacy (LIISP)

Slide 90

FIG. 17

"P3PLite", sample policy

```
<?xml version="1.0" encoding="utf-8"?>
<p3pLite name="SAMPLE P3PLITE" discuri="http://www.armageddon.com/Privacy/
PrivacyPracticeShopping.html" xml : lang="en">
  <ACCESS><all/></ACCESS>
  <DISPUTES-GROUP>
    <LONG-DESCRIPTION>privacy policy</LONG-DESCRIPTION>
    <REMEDIES>
      <correct></correct>
    </REMEDIES>
  </DISPUTES-GROUP>
  <STATEMENT>
    <CONSEQUENCE>
      We Record some information in order to serve your request and to secure
      and improve our web-site
    </CONSEQUENCE>
    <PURPOSE>
      <current/><admin></admin><develop/>
    </PURPOSE>
    <RETENTION><stated-purpose/></RETENTION>
    <DATA-GROUP>
      <DATA>
        http://schemas.microsoft.com/ws/2005/05/identity/claims/givenname
      </DATA>
      <DATA>
        http://schemas.microsoft.com/ws/2005/05/identity/claims/surname
      </DATA>
      <DATA>
        http://schemas.microsoft.com/ws/2005/05/identity/claims/emailaddress
      </DATA>
    </DATA-GROUP>
  </STATEMENT>
</p3pLite>
```

FIG. 18

USER AGENT TO EXERCISE PRIVACY CONTROL MANAGEMENT IN A USER-CENTRIC IDENTITY MANAGEMENT SYSTEM

CROSS-REFERENCE TO RELATED APPLICATIONS

This application is a continuation of U.S. application Ser. No. 14/450,436, filed on Aug. 4, 2014 entitled USER AGENT EXERCISE PRIVACY CONTROL MANAGEMENT IN A USER-CENTRIC IDENTITY MANAGEMENT SYSTEM, now issued U.S. Pat. No. 9,338,188, issued on May 10, 2016, which is a continuation of U.S. application Ser. No. 12/472,511, filed on May 27, 2009 entitled USER AGENT TO EXERCISE PRIVACY CONTROL MANAGEMENT IN A USER-CENTRIC IDENTITY MANAGEMENT SYSTEM, now issued U.S. Pat. No. 8,799,984, issued on Aug. 5, 2014, which is a non-provisional of U.S. Application Ser. No. 61/056,249, filed May 27, 2008, which are incorporated herein by reference thereto. This application is related to U.S. Provisional Application Ser. No. 60/947,708, incorporated herein by reference thereto.

This application is related to U.S. patent application Ser. No. 12/472,512, filed on May 27, 2009 entitled "USER-PORTABLE DEVICE AND METHOD OF USE IN A USER-CENTRIC IDENTITY MANAGEMENT SYSTEM", now issued U.S. Pat. No. 8,850,548, issued on Sep. 30, 2014; and U.S. patent application Ser. No. 12/472,517, filed on May 27, 2009 entitled "IDENTITY SELECTOR FOR USE WITH A USER-PORTABLE DEVICE AND METHOD OF USE IN A USER-CENTRIC IDENTITY MANAGEMENT SYSTEM", now issued U.S. Pat. No. 8,869,257, issued on Oct. 21, 2014; and U.S. patent application Ser. No. 12/472,489, filed on May 27, 2009 entitled "SYSTEM INTEGRATING AN IDENTITY SELECTOR AND USER-PORTABLE DEVICE AND METHOD OF USE IN A USER-CENTRIC IDENTITY MANAGEMENT SYSTEM, now issued U.S. Pat. No. 8,402,526, issued on Mar. 19, 2013" by the same inventors as this application and assigned to the same assignee as this application, all such applications incorporated herein by reference thereto.

BACKGROUND OF THE INVENTION

1. Field of the Invention

The present invention relates to privacy controls in identity management systems, and, more particularly, to a client-side user agent that works with an identity selector and includes the combination of a privacy engine, preference editor, and ruleset, to implement privacy controls over user identities managed by the identity selector.

2. Description of the Related Art

The collection of vast amounts of personal data via the Internet has raised a variety of privacy related concerns. Online interactions with web service providers, during which the user discloses information to the service provider to facilitate the transaction, raise issues relating to the collection of personal information, the use of personal information, the level of control exercised over the information, the sharing of personal information, and user access to disclosed personal information.

Privacy over the internet involves the ability to control what information one reveals about oneself during an online session, and to control who can access such information once disclosed. Many e-commerce websites declare their intended use of information they collect in the form of privacy policies. The policies let customers know about a site's privacy practices. Based on an examination of the policy, a user can decide whether or not the practices are acceptable, when to opt-in or opt-out (i.e., specify the conditions under which disclosure is approved), and ultimately who to do business with (i.e., interact with on the internet). The presence of privacy policies increases a user's trust level, especially in a consumer-oriented transaction.

Nevertheless, there are drawbacks. Typical policies are often difficult to understand, hard to find, take a long time to read, and can change without notice. To help the user understand the privacy policies, user agents have become available to parse the policies and present the privacy practices to the user. However, these user agents are browser-based, and so as standardized modules do not give the user any flexibility or robustness to develop user preferences in any kind of tailored or customized fashion.

Some privacy policy models include P3P, APPEL, and EPAL. P3P is a policy definition language that provides, a standard, simple, automated way for users to gain more control over the use of personal information on web sites they visit. It is a web-based language for describing the privacy policy of a web site in XML. APPEL is a privacy preference expression language for P3P. This language is used to allow users to import preference rulesets created by other parties and to transport their own ruleset files between multiple user sets. EPAL is a privacy authorization language used for writing enterprise privacy policies to govern data handling practices.

A privacy policy using P3P specifications requires six elements: purpose, recipient, retention, access, disputes, and remedies. The policy must indicate the purpose of data collection or use of data; identify all intended recipients of the collected data; describe a retention policy that applies to the data; and indicate whether the RP provides access (by the user) to the collected data. The policy must also provide a dispute resolution procedure that may be followed for mediating a dispute about an RP's privacy practices. There must also be a description of possible remedies in case a policy breach occurs.

P3P adopts a peer-to-peer strategy, which can make it difficult for a user to interact with the policy. The policies composed by P3P can have significant amounts of information present in them, much of which a user might not find relevant. Further P3P itself provides no proper algorithm to collect and match user preferences with the policies. Regarding APPEL, this language can be difficult for the average internet user to understand. It is possible, then, that organizations with otherwise good privacy policies may encounter problems having users approve of the policies, without an adequate was for the user to readily evaluate the policy. By default, perhaps, it may happen that if a policy cannot be appropriately examined, especially when a user attempts to subject the policy to a preference test, it might be rejected.

What is therefore needed is an effective mechanism enabling a user to exercise better privacy-related control over disclosures, particularly one that evaluates the privacy policy based on a comparison to user preferences designed by the user. Better still would be a privacy control that could work in conjunction with some of the most sensitive information disclosed over the internet, user identity information.

An identity selector, as part of an identity management system, affords the user control over what information is sent to a relying party. However, the identity selector does not allow users to have control over the information once it is sent to the relying party. For example, the identity selector has no feature that determines how information would be used or the purpose of information collection. The identity selector can manage disclosures at the point of origin, but not at the point of receipt. What is needed is a way for the user to measure the trust of a relationship—the interaction between a user and service provider—that satisfies the privacy requirements of the user.

It would be beneficial to add privacy modules to an identity selector, that could send notifications to the user based on the relationship of the relying party's privacy policy to the user's privacy-related preferences concerning disclosures. In particular, a tool is needed that provides identity management, especially of the user-centric type, and also provides privacy over a user's information, i.e., the disclosure of user identities.

Further, it is important to develop a privacy process more tailored and focused to the precise disclosures that are being contemplated. For example, in applications that use an identity selector to manage a portfolio of information cards (digital user identities), there are no user-managed privacy processes specifically suited to disclosures involving the information cards. The identity selector does indeed have a generalized privacy option available through the user interface (e.g., browser), but this privacy channel may not address the more sensitive privacy concerns surrounding the disclosure of identity information.

SUMMARY OF THE INVENTION

According to the present invention, a system, method, and computer-readable medium are provided that implement a client-side user agent to interact with an identity selector to exercise a privacy control process aimed at evaluating a relying party's privacy policy, especially in regard to privacy practices that impinge upon the treatment of user identity information that is being considered for disclosure by the identity selector to satisfy the identity requirements of a security policy. In one form, the user-agent includes, in combination, a ruleset, a privacy engine, and a privacy preference editor.

In several forms, the invention is practiced in a combination including an identity manager and a user agent system. The combination is provided for use in an environment including at least one security policy having requirements and at least one privacy policy. The identity manager is configured to manage a plurality of user identities and to determine whether any user identity satisfies the security policy requirements.

According to one embodiment, pursuant to this combination, the user agent system comprises a storage including at least one privacy preference relative to at least one user identity; an editor means, responsive to user selections indicating at least one preference-related input relating to at least one user identity, for generating at least one privacy preference using the user selections; a means for supplying the at least one generated privacy preference to the storage for storage therein; and an engine means, operatively connected to the storage, for evaluating at least one privacy preference against a privacy policy obtained from the environment.

According to another embodiment, a method is practiced pursuant to the combination. The method includes the user agent providing at least one privacy preference relative to at least one user identity; the user agent receiving user selections indicating at least one privacy preference-related input pertaining to at least one user identity; the user agent generating at least one privacy preference, using the user selections; the user agent furnishing the at least one generated privacy preference to the providing step; and the user agent evaluating at least one privacy preference against a privacy policy obtained from the environment.

In other forms, the invention is practiced in a user environment including an identity manager and a user agent system. The user environment is configured for use in an operating environment including at least one security policy having requirements and at least one privacy policy. The identity manager is configured to manage a plurality of user identities and to determine whether any user identity satisfies the security policy requirements.

According to another embodiment, there is provided a computer-readable medium in the environment. The computer-readable medium has computer-executable instructions for execution by a processor, that, when executed, cause the processor to: provide, via the user agent, at least one privacy preference relative to at least one user identity; receive, via the user agent, user selections indicating at least one privacy preference-related input pertaining to at least one user identity; generate, via the user agent, at least one privacy preference, using the user selections; furnish, via the user agent, the at least one generated privacy preference to the provide operation; and evaluate, via the user agent, at least one privacy preference against a privacy policy obtained from the environment.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein:

FIG. 5 is a sectional view of a GUI screen shot showing the prompts used to build a ruleset applying to an information card, according to the invention;

FIG. 9 is a table presentation of a preference matrix showing how various privacy preferences used in the invention apply to P3P privacy policy practices;

FIGS. 15-17 is a tabular listing of the requirements and specifications for the interaction shown in FIGS. 13-14;

FIG. 18 shows an exemplary listing of a reduced privacy policy generated by privacy policy editor 34.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
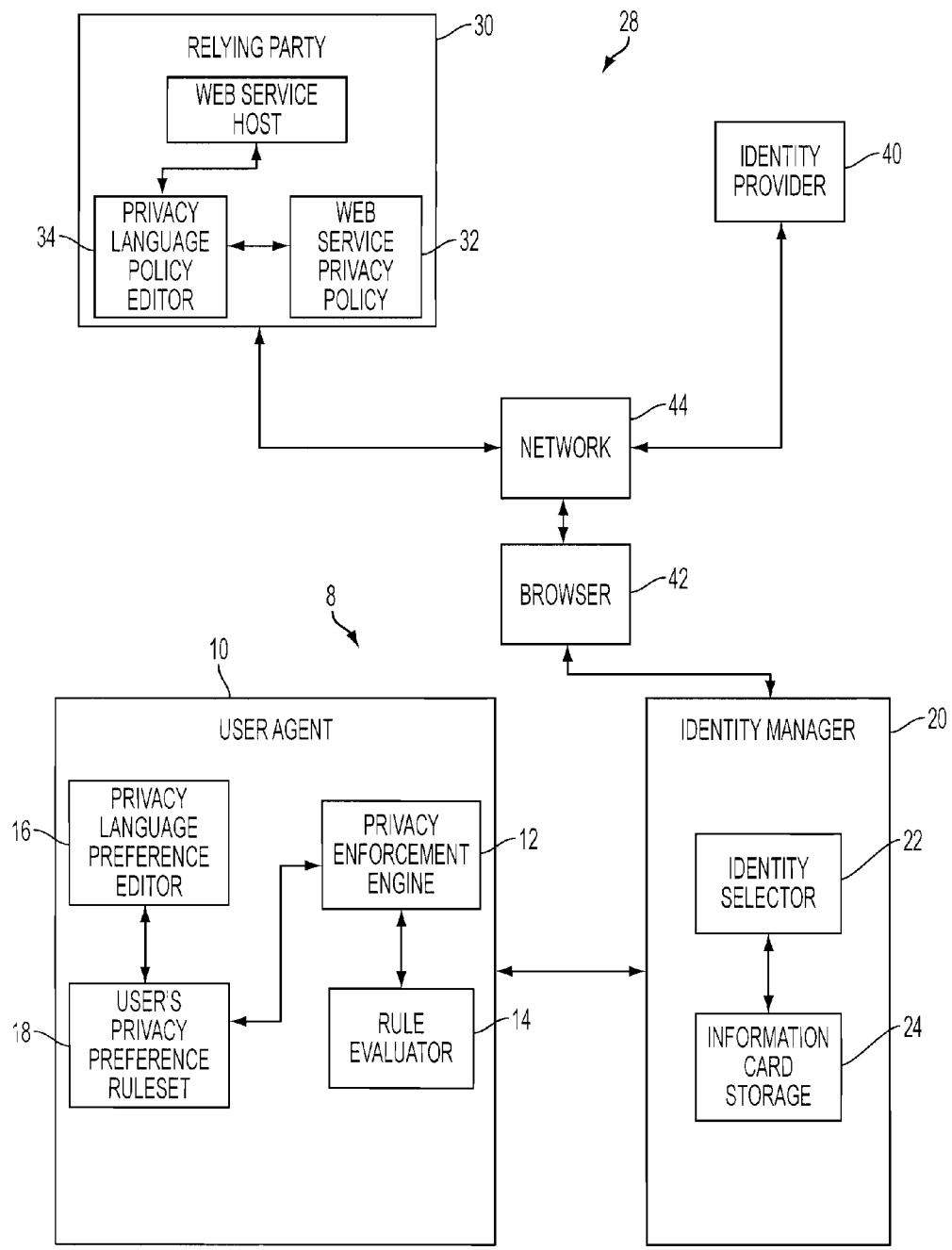
FIG. 1 is a block diagram illustration of a user-centric identity management system adapted for use with a privacy management system, according to one embodiment of the invention.

Referring to FIG. 1, there is shown a block diagram illustration of a privacy management system, particularly for use in a user-centric identity management system employing an identity selector to control the use of user identities.

The system, according to the invention, includes a user agent 10 having a privacy enforcement engine 12, a rule evaluator 14, a privacy language preference editor 16, and a privacy preference ruleset 18. The system further includes an identity manager 20 having an identity selector 22 and an information card storage 24. In one exemplary form, the combination of user agent 10 and identity manager 20 is resident on a common host machine or computing platform 8.

The combination of user agent 10 and identity manager 20 operates within an exemplary application environment 28 (e.g., internet), including a service provider environment illustratively represented by relying party 30 and an identity provider environment illustratively represented by identity provider 40. The relying party 30, or service provider, includes a web service host 32 (e.g., server), a web service privacy policy 34, and a privacy language policy editor 34. The host 8, including the combination of user agent 10 and identity manager 20, is connected to the application environment 28 via a browser 42 and network 44.

By way of overview, the privacy management processes of the invention are resident in user agent 10, while the identity management processes are resident in identity manager 20. According to the invention, user agent 10 implements privacy controls relative to the identity-related disclosures pertaining to the operation of identity manager 20, specifically those involving information cards 24.

In another aspect of the invention, the privacy language policy editor 34 is provided to process the privacy policy 32 pertaining to relying party 30.

According to the invention, privacy language editors 16 and 34 are implemented respectively at the client-side and server-side of an interactive online relationship. These editors find particular application with user-centric identity management systems, namely, by working in conjunction with identity manager 20. The privacy protection processes afforded by the invention can supplement and complement the security measures conducted by client-side identity management processes (i.e., identity manager 20), thereby providing a measure of both security and privacy safeguards on one common platform (host 8).

According to one working example of the invention, FIG. 1 illustrates a use directed to an operating environment that employs information cards 24 as part of the process to disclose user identity information, such as an authentication process conducted within the context of an online interaction between the user and a service provider (i.e., the relying party 30 requiring authentication). The user manages the user's identities, via identity manager 20, in order to comply with the identity requirements specified by the relying party's security policy. The user, via identity manager 20, selects which user identity to proffer to satisfy the security policy.

According to the invention, user agent 10 enables the user to apply user privacy preferences to any process encompassing the disclosure of user identity information, specifically that involving identity manager 20. The user exercises control over which, if any, user identity to disclose, based on an evaluation of the relying party's privacy policy relative to user preferences. Accordingly, two levels of management and control can be applied to the disclosure of user identity information, suited to address both security issues and privacy matters.

In particular, identity selector 22 examines the information cards, each representative of a user identity, and determines which user identities satisfy the service provider's security policy. The identity selector 22 thus performs a filtering function. The privacy enforcement engine 12 also performs a filtering function relative to the information cards, in regard to whether the privacy policy conforms to user privacy preferences over disclosures pertaining to the user identities. This privacy filter can be applied on a per-card basis. Thus, information cards can be examined for compliance with the relying party's security policy, and subjected to privacy management by way of evaluating the recipient's privacy policy in reference to privacy preferences that apply to the relevant cards.

The features of the identity selector 22 and the privacy engine 12 combine to enable the user to select an information card that complies with the security policy of the security provider (i.e., the identity selector function), and to ensure that disclosure of such information is approved for release subject to a satisfactory match between the user privacy preferences and the privacy policy (i.e., the privacy engine function). In particular, this approval occurs when the privacy policy has been deemed acceptable in reference to the disclosure of user identity information pertaining to the subject card.

According to the invention, the user implements privacy preferences, and thereby exercises privacy control and management over the release of identity information via identity manager 20, by interacting with preference editor 16 to generate privacy preference rules. Preference editor 16 allows the user to generate a ruleset 18 that is used by privacy engine 12 (via rule evaluator 14) to evaluate the acceptability of the relying party's privacy policy. In this way, the user decides whether to permit the identity manager 20 to disclose a user identity that is otherwise satisfactory (i.e., it meets the identity requirements of the relying party's security policy).

Referring now to FIG. 1, and first to identity manager 20, the identity selector 22 manages the identity requirements of an online interaction between a user and service provider. As used herein, the management capability of the identity selector should be construed as encompassing all of the functions and operations performed by the identity selector, specifically with respect to the portfolio of information cards that it can access. For example, the identity selector has an editor function (e.g., create, review, update, and delete information cards), and a usage function that directs, controls, and otherwise supervises the use of the user identities represented by the information cards. The management processes are typically executed within the context of an authentication process conducted during an online interaction between the user and service provider, relative to a user's request for access.

In brief, the identity selector 22: (i) receives and processes a security policy from relying party 30 (service provider), sent as part of a request for a security token replying to a user's request for access, (ii) retrieves and determines which information cards 24 satisfy the identity requirements of the security policy, (iii), enables the user to select one of the eligible cards determined to satisfy the security policy, (iv) requests the issuance of a security token from the appropriate identity provider 40, in reference to the card selected by the user, and (v) receives and forwards the security token to the relying party 30, as the response to the relying party's request for a security token.

In one exemplary operating scenario, a user attempts to access or request a web service or resource. In order to authenticate the user, and as a condition to deciding whether to authorize the access, the relying party 30 responds with a security policy describing the identity requirements needed to facilitate this online interaction or transaction. This response is typically a request for a security token that contains certain specified claim assertions necessary for the authentication process. The security policy is received at the user's host machine 8, and this event invokes the identity selector 22 to handle the processing of the security token and to formulate a response (i.e., directing the issuance of an appropriate security token).

The identity selector 22 examines the security policy and determines whether any of the user identities available to it satisfy the security policy. For this purpose, the available user identities can include third-party managed cards resident with the identity selector (i.e., stored on the local machine); self-issued identity cards (the editor allows the user to create such cards); and information cards retrieved from a user-portable personal security device plugged into the machine (e.g., a Java-powered iButton smart card). Information card storage 24 furnishes managed cards and self-issued cards to identity selector 22.

The identity selector 22 then presents to the user, in visual form, the portfolio of cards available for use in the authentication process, i.e., the eligible cards are those determined to satisfy the identity requirements of the security policy. The user is then prompted to select one of the cards from a user-interactive screen that displays the eligible cards. The identity selector 22 generates a token request in reference to the selected information card. The token request is forwarded to the appropriate identity provider 40 associated with the selected card, i.e., the identity provider that issued the managed card. If the token request is approved, the identity provider 40 issues a security token and returns it to the identity selector 22. The identity selector 22 then forwards the security token to the relying party 30 to comply with the identity requirements of the security policy.

It is a feature of the invention that any release of identity information to the relying party 30, such as the security token issued by identity provider 40, be conditional upon a decision by the user to approve such disclosure based on a determination that the privacy policy of the relying party 30 is acceptable. The invention provides a user agent 10, which implements a privacy management and control process, to accomplish such a purpose. The user is enabled by preference editor 16 to generate a user-authored privacy preference ruleset 18 that privacy engine 12 uses in the policy evaluation process conducted by rule evaluator 14. The evaluation results—match or no match—dictate actions (ruleset behaviors) that reflect user-authored decisions on how to treat various privacy practices in view of user privacy preferences. The privacy control operations of user agent 10 allow the user to ultimately direct the release of any user identity information (i.e., information cards) otherwise found to satisfy the security policy.

Referring still to FIG. 1, and specifically to user agent 10, the privacy enforcement engine 12 includes any facility or agent-based application that processes the privacy policy 32 received from relying party 30, and conducts the evaluation of user preferences (ruleset 18) against the privacy policy 32. Any means known to those skilled in the art can be used to implement engine 12. In a conventional manner, engine 12 fetches the privacy policy 32 sent from relying party 30, and evaluates it according to the user's ruleset 18 (i.e., the statements expressing the user's privacy control preferences). Engine 12 directs rule evaluator 14 to evaluate or compare the ruleset 18 against the evidence presented to it, i.e., the relying party's privacy policy 32. Engine 12 governs and otherwise manages the operation of rule evaluator 14, which can be provided in any conventional form.

Based on this evaluation conducted by rule evaluator 14, user agent 10 determines and implements what course of action to take, i.e., perform the behavior specified in the ruleset. For example, an affirmative match between ruleset 18 and privacy policy 32 is deemed to fire the matched rule, which in turn triggers a corresponding behavior dictated by the fired rule. Any type of behavior may be programmed into the ruleset, such as a request action that approves disclosures to the relying party (i.e., the privacy policy is deemed acceptable); a block action that denies disclosures to the relying party (i.e., the privacy policy is deemed unacceptable); and an intermediate action that might, for example, inform the user about a certain privacy practice in place or prompt the user to make a decision regarding acceptance or denial of the privacy policy.

All of these behaviors represent decisions that are tailored to manage and control the disclosure of identity-related information by identity manager 20. The behaviors implement user decisions regarding what action to take when certain events or conditions occur regarding the relationship of the user's privacy preferences to the privacy practices embodied in the privacy policy 32.

In sum, engine 12 is located at the client-side in the form of user agent 10, and interacts with ruleset 18. Engine 12 manages rule evaluator 14 that compares ruleset 18—expressing user preferences on the disclosure of user identity information—to the privacy policy of the service provider. Ruleset 18 preferably reflects user privacy preferences in regard to the disclosure of information relating to user identities, namely, the information cards 24.

Based on this evaluation, engine 12 enables the user to supervise and directly control the disclosure of user identity information. For example, the user, relying upon the evaluation results, can make a decision about whether to release user identity information. In this manner, the user exercises privacy controls over the information cards of identity manager 20, and so is able to determine which user identity, represented by a corresponding information card, is to be disclosed. Thus, privacy engine 12, like identity selector 22, performs a filtering function.

According to the invention, the ruleset 18, which is used by privacy engine 14 in the evaluation process performed by rule evaluator 14, is constructed and otherwise provided by the user by interacting with preference editor 16. The user is thus able to exercise privacy controls over the identity disclosures made by identity manager 20, since the ruleset 18 established by the user governs the privacy policy evaluation process and circumscribes the behaviors that are triggered according to the evaluation results.

Referring still to user agent 10, preference editor 16 enables the user to construct and otherwise build ruleset 18 for use by engine 12 in regard to the evaluation process performed by rule evaluator 14. Ruleset 18 expresses the user's privacy preferences, particularly with regard to user-identity information that is under the management of identity manager 20. The privacy preferences expressed in and defined by ruleset 18 represent the user's desires regarding the collection and treatment of information exchanged between the user and relying party 30. As known, a rule is the formal expression of a user's preference. Rules express the users preferences that are then compared to a service's privacy policy, such as a P3P policy. The action resulting from a successful match is defined by the behavior specified by the rule.

Editor 16 allows the user to establish preference expressions (ruleset 18) according to any type of setting criteria. For example, the user can be provided with certain preset privacy levels (privacy labels) from which to choose. Each privacy level would reflect a different degree of privacy control. Accordingly, each privacy level would be implemented by a respective ruleset having user privacy preferences that appropriately reflect the privacy level.

Figure 3A:
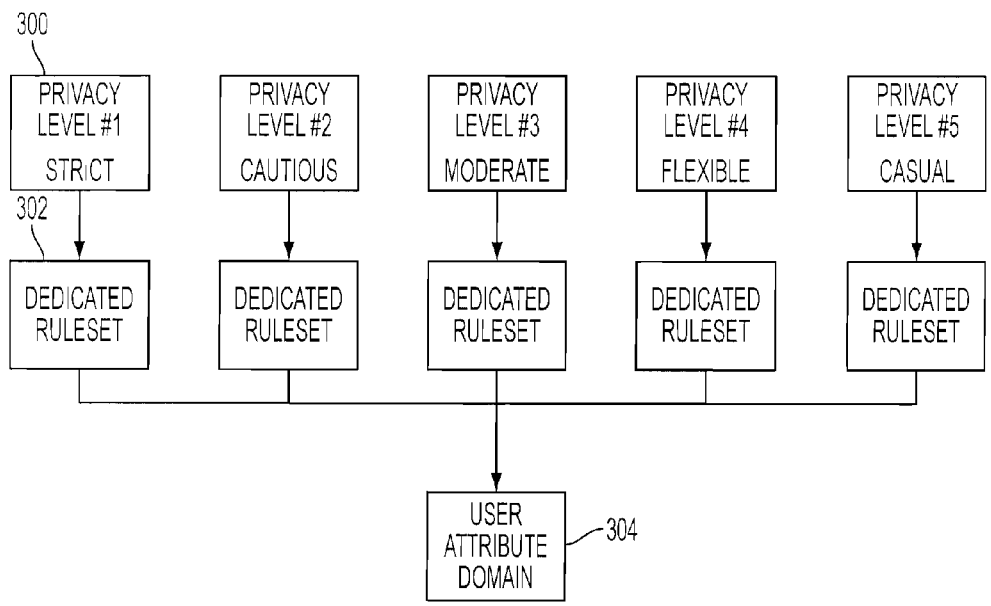
FIGS. 3A-B are block diagram illustrations of alternate schemes to organize a privacy preference ruleset based on multiple privacy level categories, and the grouping of attributes under the categories, according to the invention.

FIG. 3A shows the scheme for organizing an illustrative set of preset privacy levels, such as strict, cautious, moderate, flexible, and casual. Each level is associated with a certain scheme of privacy preferences. Accordingly, each privacy level 300 has a dedicated ruleset 302 associated with it. In this configuration, each ruleset 302 reflects user privacy preferences with respect to at least one user attribute 304. The individual rulesets in this scheme reflect preferences with respect to a common set of user attributes 304, although the preferences instituted among the various privacy levels for a certain same attribute will vary depending upon the amount of privacy control that governs each level. The same attribute can have a different level of privacy control—and a correspondingly different privacy preference—from one level to another.

The various rulesets 302 are situated within ruleset 18 and thereby available for use by privacy engine 12. In operation, the user agent 10 permits the user to select one of the privacy levels 300. This selection invokes the relevant ruleset 302 corresponding to the selected privacy level. The privacy engine 12 then compares the invoked ruleset 302 to the privacy policy to determine if the policy matches the user privacy preferences specified by the selected privacy level.

Figure 3B:
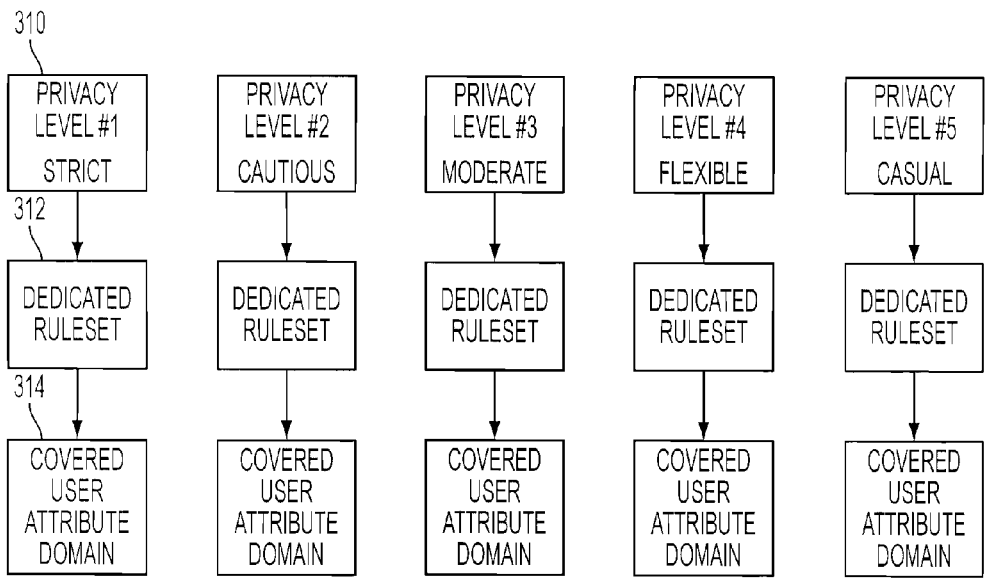

FIG. 3B shows an alternative scheme in which the individual privacy levels 310 have a dedicated ruleset 312 that covers a specific set of user attributes 314, rather than the entire space of user attributes as in FIG. 3A. The ruleset 312 is otherwise agnostic to the other attributes. The assignment of attributes to a respective privacy level can be done according to any scheme or criterion. It is possible to establish the coverage for each category—namely, what attributes a certain privacy level applies to—in any suitable fashion.

For example, the user can assign or apply attributes chosen by the user to certain corresponding preset privacy levels, thereby populating each privacy level with a certain group of selected attributes. These attributes correspond to certain types of disclosures over which the user desires to exercise privacy controls, namely, elements of user identity. The domain of user identity attributes is organized so that each attribute belongs to one (or perhaps more) privacy protection levels. The ruleset 18 is thus organized according to preset privacy levels (labels) each covering a certain sphere of disclosures. In an operating scenario involving the identity selector 22, the attributes would reflect information that the relying party is calling for in the token request; for example, the contents of the claims required by the relying party. The assignment between privacy levels and attributes (i.e., items for disclosure) reflects the user's commensurate degrees of privacy protection expected from the relying party.

For example, attributes assigned to a strict level have the highest level of protection accorded by the user, and so any potential disclosure involving these attributes requires the privacy policy of the relying party to meet the highest standards of privacy protections relative to its practices concerning purpose, recipient, retention, access, disputes, and remedies. The strict assignment is typically reserved for information deemed most sensitive by the user. At the other end, a casual level requires the lowest level of promised protection, and likely is reserved for information that the user regards as the least sensitive.

Figure 2:
FIG. 2 is an example listing of a rule implementing a strict policy and a tabular matrix showing an assignment depicting the relationship between various privacy levels and user identity attributes, for use in the practice of the invention.

Referring to FIG. 2, there is shown a sample XML listing of a ruleset expression that establishes one of the preset privacy levels (strict). The table illustrates a matrix showing the relationship between the attributes (by row) and the different privacy levels (by column). The indicated attributes are credit card, first name, and address, although any others can be used. The matrix indicates that each privacy level institutes its own set of behaviors—namely, actions taken on the basis of the privacy policy evaluation—for the given attributes. The matrix, in particular, reflects how the preferences for each privacy level apply to each attribute. Preference editor 16 allows the user to author the privacy protection scheme indicated by the matrix, namely, the ruleset that implements such privacy preferences as applied to specified information (attributes).

The FIG. 2 listing implements a ruleset applying the strict privacy control to the attributes of credit card, first name, and address. According to one exemplary rule indicated in the listing, when there is a policy mismatch (i.e., the result of the evaluation performed by rule evaluator 14), the rule triggers the noted behavior, namely, a prompt to the user that queries: "There was a request for your [first name] [Credit Card No] [Address] with a policy mismatch. Do you want to give away data?" The occurrence of this query indicates that the applicable rule was evaluated against the privacy policy, and there was a mismatch. The mismatch condition reveals that the relying party's privacy policy did not meet the privacy standard—reflected in the strict privacy scheme—expected by the user for disclosures containing the first name, credit card no., and address. Nevertheless, the rule allows the user to still opt-in or opt-out of the disclosure ("Do you want to give away data?").

The schemes of FIGS. 3A and 3B can be invoked in various ways, in order to apply a certain privacy level—and hence a corresponding ruleset—to the evaluation process conducted by the privacy engine 12. A privacy level can be designated for use in an agnostic fashion with respect to the information cards under consideration and the attributes being requested by the relying party. A certain privacy level can be selected, and its corresponding ruleset applied, without regard to the attributes that are being requested by the relying party's security policy. Instead, the user can select the desired privacy level on the basis of any set of factors or considerations. For example, depending upon the identity or type of relying party, a user can select an appropriate level of privacy to examine the privacy practices. Further, a user can make a privacy level selection on the basis of the cards that satisfy the security policy. A user's awareness of the identity information referenced by each card can prompt selection of an appropriate privacy level.

Alternately, the determination of which privacy level to use can be coordinated with the process that processes the security policy and determines which cards satisfy the security policy requirements. For example, the reference in the ruleset of FIG. 2 to "a request for your [first name] [credit card] [address]" reveals what attributes are being requested by the claims section of the security policy. Further, the reference to "a policy mismatch" reveals the outcome of the privacy policy evaluation with respect to a rule governing user preferences for these attributes. There is then a working relationship between the privacy engine and the identity selector, namely, a level of coordination, synchronization, and interaction between the operations of identity selector 22 and privacy engine 12.

In different forms, it is possible to invoke privacy engine 12, and consequently the rule evaluation, on the basis of claims data in the security policy, and, alternatively, on the basis of the information cards. However, other interaction schemes are also possible.

In one configuration, for example, the identity selector 22 receives the security policy from the relying party. The security policy specifies the claims that are needed to authenticate the user. These claims indicate assertions of information about the user. The identity selector 22 processes the security policy to identify the underlying claims. On the basis of the requested claims, the identity selector 22 (or other suitable agent) can invoke the privacy engine 12 to check whether the proposed disclosure of user identity information encompassed by each claim is authorized by the user. In particular, the summons of information called for by a claim invokes a certain privacy preference rule that addresses the very information referenced by the claim. For example, a claim that requests a user's first name, credit card no., or address causes the privacy engine 12 to use that rule from ruleset 18 that applies to this information, i.e., the strict privacy rule.

Alternatively, other types of coordinated interoperation between the identity selector 22 and privacy engine 12 are possible. The identity selector 22 determines which information cards contain user identities that satisfy the security policy. These eligible cards likewise reflect the claims required by the security policy, since they have been determined to satisfy the security policy. At this point, the privacy engine 12 can be invoked. The privacy engine 12 identifies those rules in ruleset 18 that apply to attributes—user identity datum—found in the eligible information cards. For example, an information card that discloses a user's first name, credit card no., or address causes the privacy engine 12 to use that rule from ruleset 18 that applies to this information. For this purpose, engine 12 employs any suitable means to associate user identity attributes with corresponding privacy levels. Thus, regardless of whether the user identity attributes proposed for disclosure are retrieved from the processing of a security policy's claims, or an information card deemed to match the security policy, the indexing of such attributes to corresponding privacy level rules in ruleset 18 allows the privacy engine 12 to tailor the evaluation of the privacy policy to the specific disclosures of interest.

The privacy engine 12 evaluates the relevant rule again the privacy policy. This process yields a match/no match outcome that the user employs to decide whether to proceed with processing of the information card, i.e., to request a security token based on the information card. The privacy engine 12 can be invoked to perform this card-based evaluation either on the basis of all the eligible information cards deemed to satisfy the security policy, or just the one card among them that the user selects.

Editor 16 offers other ways to organize the preferences (i.e., ruleset 18) apart from using preset privacy level categories. For example, editor 16 may be operated in a custom mode allowing the user to manually change or create each preference. Additionally, ruleset 18 can be populated with imported rulesets obtained from other platforms.

Figure 7:
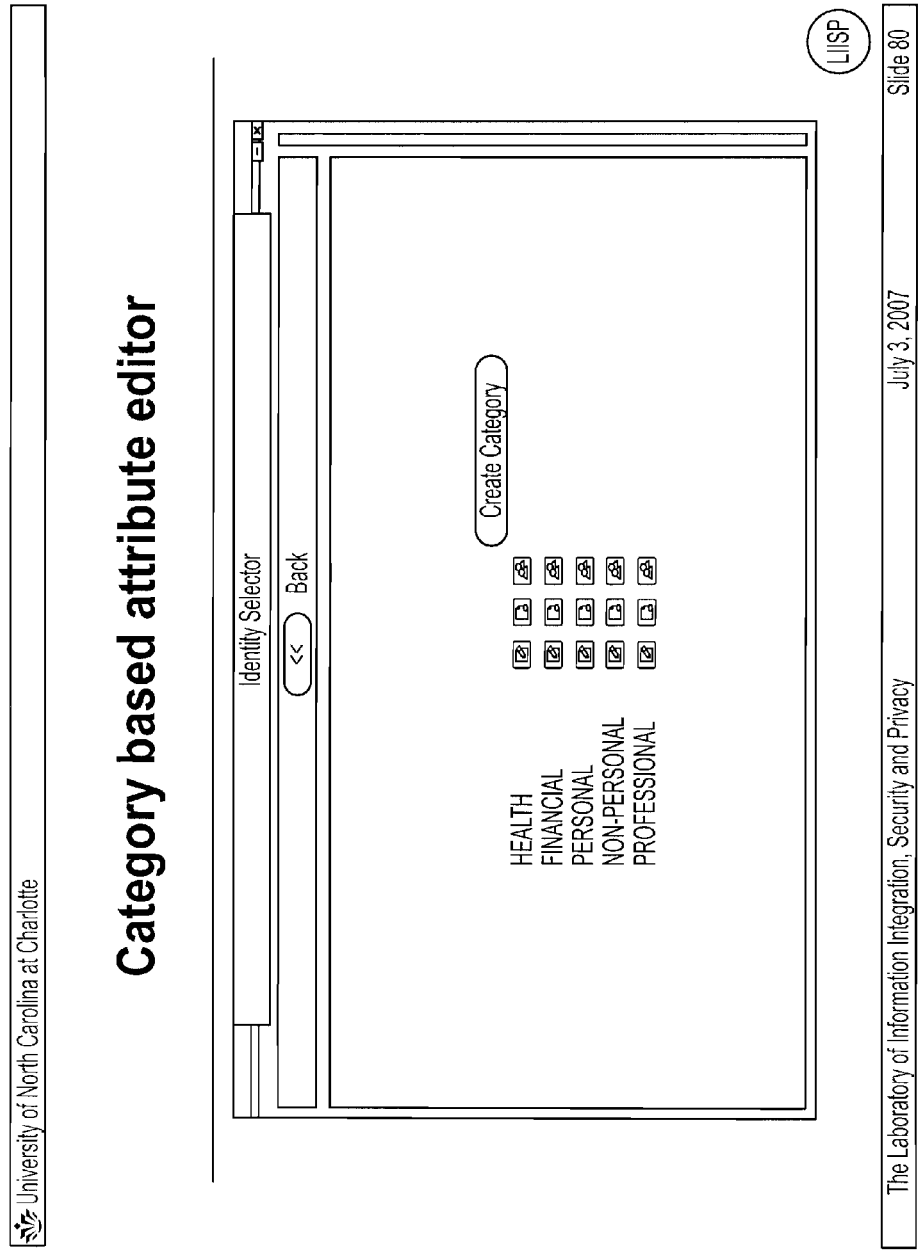
FIGS. 7-8 are GUI screen shots depicting an illustrative process for creating the categories shown in FIG. 6.
Figure 8:
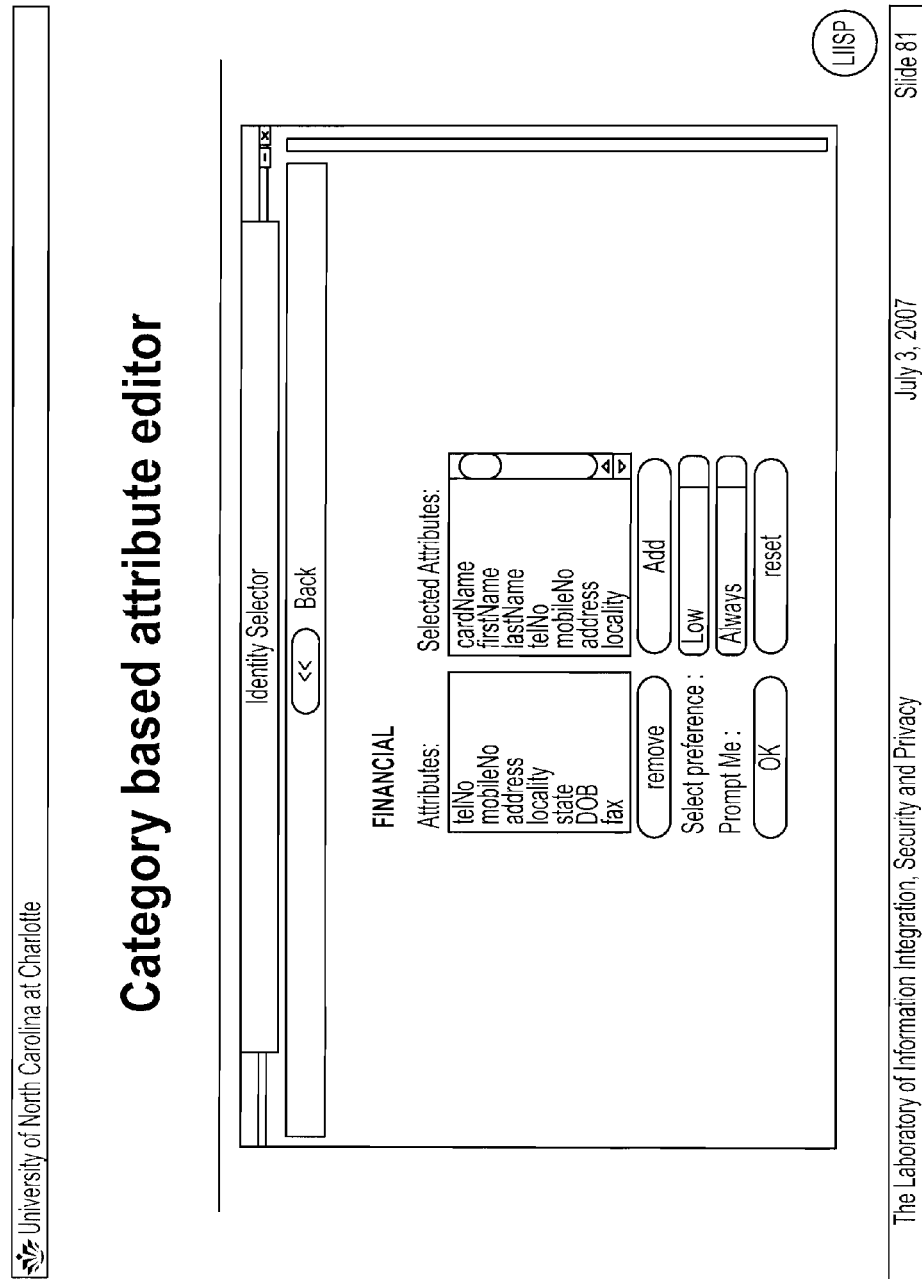

In addition to the schemes set forth in FIGS. 2 and 3 that use privacy levels as the organizing principle to group rulesets, the invention can also employ card-based and category-based schemes to implement privacy preferences, and so direct the promulgation of rules to effect these schemes. According to the invention, two schemes can be used: (1) preference over information cards (FIGS. 4-5), and (2) categorized privacy preferences (FIGS. 6-8).

In the card-based preference scheme, a privacy preference is assigned to the card, while in the category-based preference scheme, a preference is assigned to a category populated by attributes. Each attribute is mapped to a category (and thus a preference), and so each card effectively has a preference attached to it by way of the attributes that is contains. These preference schemes provide a way to index privacy preferences to information cards and to attributes (e.g., a categorized group of attributes or a one-to-one per-attribute assignment).

The privacy editor 16 of FIG. 1, discussed further in relation to FIGS. 4-9, carries out the tasks and operations needed to generate the card-based and category-based preference schemes. For example, editor 16 enables a user to assign a preference to each individual information card. For this purpose, editor 16 is configured to access and present to the user any of the information cards used by the identity selector. Editor 16 can present any type of preference scheme for selection by the user. For this purpose, editor 16 is configured to provide various preference schemes, which can be amended or supplemented with other schemes. For the category-based scheme, editor 16 is configured to define and present various categories for user selection, and to present various attributes for selection and assignment to a category. Editor 16 also allows the user to assign preferences both on a category basis and an attribute basis. All of the user inputs can be made by way of user selections from menu options, although any other interactive input mechanism is possible. Editor 16, in sum, provides all of the tools needed to enable the user to construct card-based and category-based privacy preference schemes.

Figure 4:
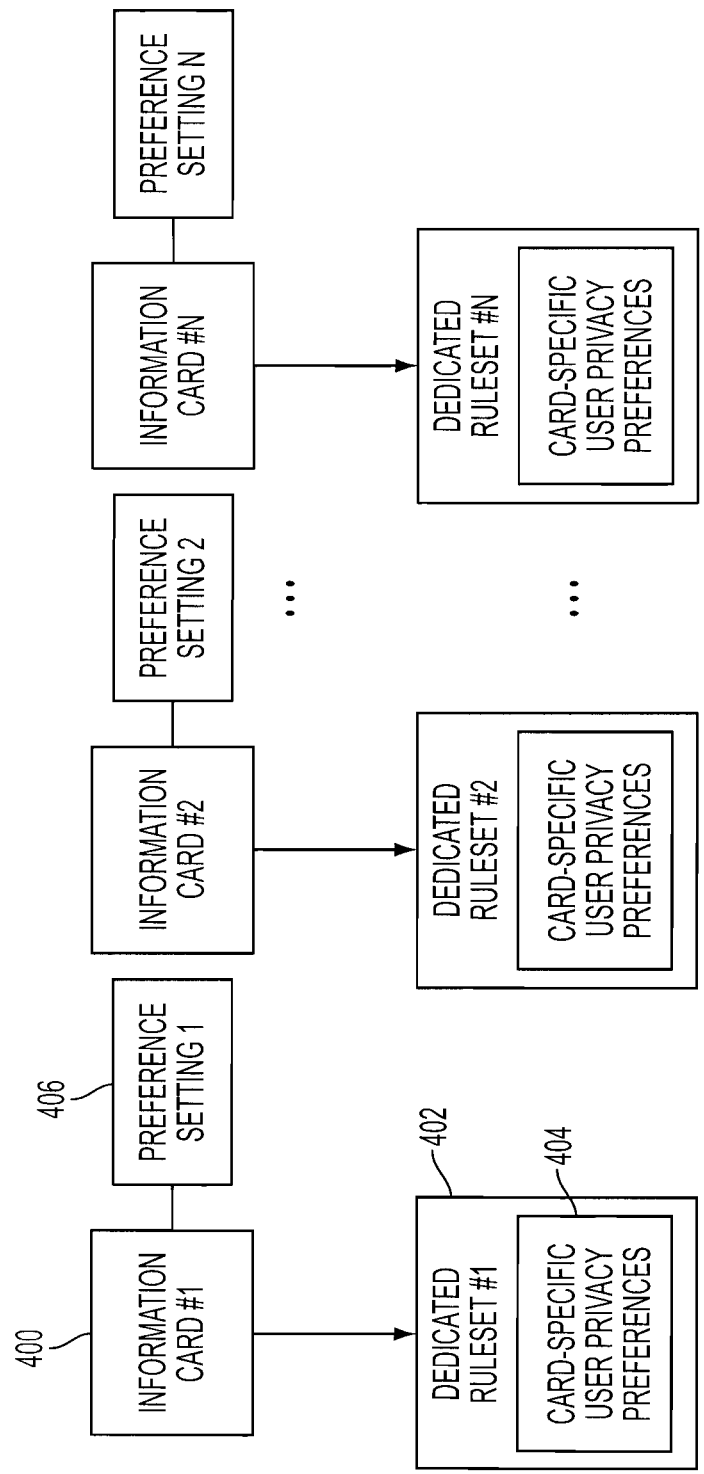
FIG. 4 is a block diagram illustration showing the card-based organization of the user privacy preferences, according to the invention.

Referring now to FIG. 4, the block diagram illustrates the card-based organization of the user privacy preferences. Each information card 400 has a dedicated ruleset 402 expressing card-specific user privacy preferences 404 that determine a corresponding card-specific preference setting 406.

According to the card-based preference scheme, the user can set the preferences over the information cards directly mapped to the card name. The preferences will be applied to the card as a whole, and not the individual attributes referenced by the information card. In practice, each information card will have a corresponding ruleset that applies to it. This card-specific ruleset establishes a desired scheme of privacy control tailored to that card. Each card, then, has its own set of user privacy preferences. For this purpose, ruleset 18 will have an indexing mechanism that associates an information card indicator to its corresponding ruleset. In this manner, when privacy engine 12 is invoked with respect to a specific information card, privacy engine 12 obtains the appropriate card-specific ruleset from ruleset 18 and uses it in the evaluation process conducted by rule evaluator 14. The privacy engine is so invoked when the user agent deems to determine whether the disclosure of a certain information card can be approved, relative to whether the privacy policy provides sufficient protection satisfying the card-specific privacy preferences.

In one form of this scheme, the privacy preferences will be stored within the information card file, making the preferences portable with the card. The card-specific ruleset need not be contained in ruleset 18. Instead, the ruleset expressing the card-specific privacy preferences is stored on the relevant information card. So, when the privacy engine 12 is invoked with respect to a certain card, the card-specific ruleset is retrieved from the card file and used by rule evaluator 14.

FIG. 5 is a sectional view of a GUI screen display showing the queries used to build a ruleset applying to an information card. The user interacts with a process illustrated by FIG. 5 to select privacy preferences, and so generate ruleset 402 (FIG. 4) applying to a specific noted card. The preference editor 16 (FIG. 1) manages and directs the operations to construct the card-based preference scheme. Editor 16 would generate displays such as the FIG. 5 screen.

Referring to FIG. 5, the preference editor 16 generates queries posed to the user, eliciting a response. The user's response to each question is encoded by editor 16 into an implementing rule. For example, in FIG. 5, a "yes" reply to the first query means that the user desires to be prompted when the evaluation of the privacy policy indicates that it is a practice of the relying party to have "Information shared with the third party for marketing and analysis." The prompt represents a behavior of the underlying rule when a match occurs. By being so notified, the user can then opt-in or opt-out of the disclosure of the indicated information card. Likewise, a "yes" reply to the second query causes a similar behavior under the noted privacy policy condition.

A query-reply format similar to that shown in FIG. 5, or any other preference intake method, can be undertaken by editor 16 to enable the user to define the user preferences for each information card, and so build a dedicated ruleset corresponding to each card. It should be apparent to those skilled in the art that editor 16 can pose any type of interrogatory to the user that is directed to acquiring privacy preferences and thereby composing a ruleset.

Figure 6A:
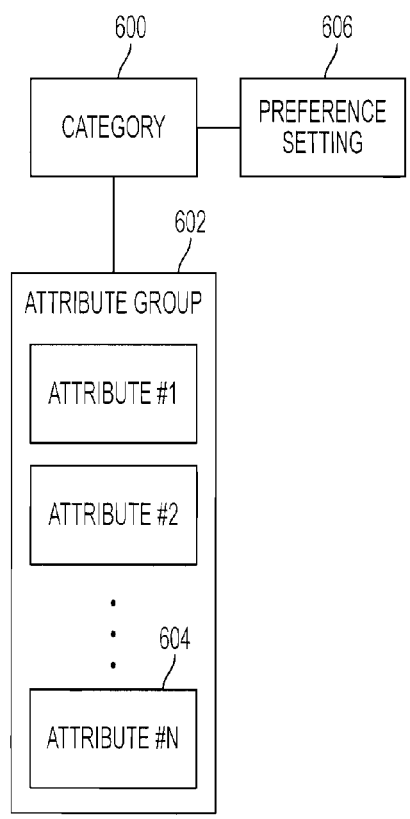
FIGS. 6A-B are block diagram illustrations of alternate configurations to implement the category-based scheme to organize user privacy preferences, according to the invention.

Referring now to FIG. 6A, in addition to the card-based privacy preference approach, the invention also provides an attribute-driven, category-based privacy preference scheme. FIG. 6A schematically shows the category-based approach to organizing user privacy preferences, according to one exemplary category structure. The preference editor 16 directs and manages the operations to construct the category-based preference scheme.

According to the category-based scheme, a set of illustrative categories 600 are established. The attributes are then assigned, as appropriate, to each category. A mapping facility maps each attribute to its appropriate category. A category typically will have a definition or scope that indicates the kind of attributes belonging to it, and so facilitates the mapping or assignment of the attribute to its relevant category. The collection of attributes 604 covered by a certain category 600 forms a category-specific group 602. An attribute may belong to more than one category. In a user-interactive implementation, the user conducts the mapping operation by selectively assigning each attribute to a category. Thus, the categories are populated by the user.

A user privacy preference 606 is set to each category. The preference 606 represents a corresponding ruleset that is invoked to conduct the privacy policy evaluation. In operation, for example, during an authentication process, the claims of a security policy specify the required attributes needed in a security token. These required attributes are then cross-referenced to the category-based preference scheme, to identity the categories to which the required attributes belong. The privacy preferences corresponding to the matched categories serve as the basis for conducting the privacy policy evaluation.

Users can create categories like FINANCIAL or PERSONAL, typically oriented towards a certain subject matter. Attributes are then grouped under each category as appropriate. An attribute, for example, is properly assigned or mapped to a certain category when the attribute falls within the subject matter domain of the category. Examples of attributes, which are user identity elements, include information such as given name and first name. Because a preference is set to each category, each attribute within the category also receives the same preference association (i.e., designation or assignment). The category preferences are preferably portable from one user agent to another, relative to building ruleset 18.

All of the unique attributes present at a given instant in the operating environment are grouped into the categories. A given attribute can be covered by more than one category, so that the attribute will be located in each relevant category. A privacy label, indicative of category preference, is attached to each unique attribute within a category. A privacy label indicates what category the attribute belongs to, i.e., the category it has been mapped to or grouped under. These preference labels are reflected over all the attributes of the information cards. By propagating these preference labels throughout the cards, each user identity attribute of each information card becomes linked to a corresponding privacy label, and so becomes linked to one or more categories that cover the attribute. The card attributes, then, can be indexed to user privacy preferences, by virtue of the relationship between a card and a category, i.e., each attribute is grouped under a category. This assignment of attribute to category, and so also to privacy preference, makes the policy evaluation process more fine-tuned since the privacy preferences that are invoked are correlated to the very information (user attributes) that are subject to a disclosure request.

FIG. 6A discloses a means to effectively associate or map each attribute with a corresponding privacy level or preference scheme. In this manner, the appropriate privacy scheme can be invoked by the privacy engine by first determining the attributes required by the security policy, then identifying the preference scheme mapped to this attribute. FIG. 6A accomplishes such an association by grouping the attributes under different categories, and setting a privacy preference to the category, effectively assigning the same privacy preference to all of the attributes grouped under the category. However, other means can be used to associate a user attribute to a privacy preference scheme.

The combination of a card-based preference and a category-based preference enables two levels of preference expression to be applied to the use of a card. A user can decide which mode of preference expression to use. For a given attribute, it is possible to have more than one privacy label attached to it, if the attribute has been mapped to more than one category. In this event, the card-based preference can be compared to the competing, category-based preference labels attached to the attribute, in order to resolve the conflict. A proper resolution, for example, might give precedence to the preference dictated by the card-based scheme. Any other means of conflict resolution can be employed.

Reference is now made to FIGS. 7-9 to facilitate explanation of the category-based preference scheme of the invention. FIGS. 7-8 are GUI screen shots depicting an illustrative process for creating the attribute-populated categories, first to create the categories (FIG. 7) and then to populate them (FIG. 8). Editor 16 would generate the screen displays such as the ones in FIGS. 7-8. FIG. 9 presents a preference matrix showing how various privacy preferences used in the invention apply to P3P privacy policy practices. The designations in the first column—STRICT, CAUTIOUS, MODERATE, FLEXIBLE, and CASUAL—specify preference labels used to set the preference for each category, and signify a corresponding ruleset to implement the desired privacy control.

Referring to FIG. 7, the preference editor 16, under the direction of the agent managing the identity selector, generates a screen to present various categories to the user. A user can select to create one or more of the listed categories. Once created, a category must have a preference assigned to it, and then populated with attributes.

FIG. 8 shows one exemplary GUI screen useful in populating the FINANCIAL category, as created from the FIG. 7 screen. The user is presented with a list of attributes to select from ("Attributes:"). The selection of an attribute assigns that attribute to the FINANCIAL category. The selected attributes are shown ("Selected Attributes:"). The "Select preference" function allows the user to designate a privacy preference for the FINANCIAL category (or individually to each attribute). The "Prompt me" function allows the user to indicate whether the user wants to be notified when the attribute becomes the subject of a potential disclosure, or, alternately, when a privacy policy mismatch occurs pertaining to this attribute.

Figure 6B:
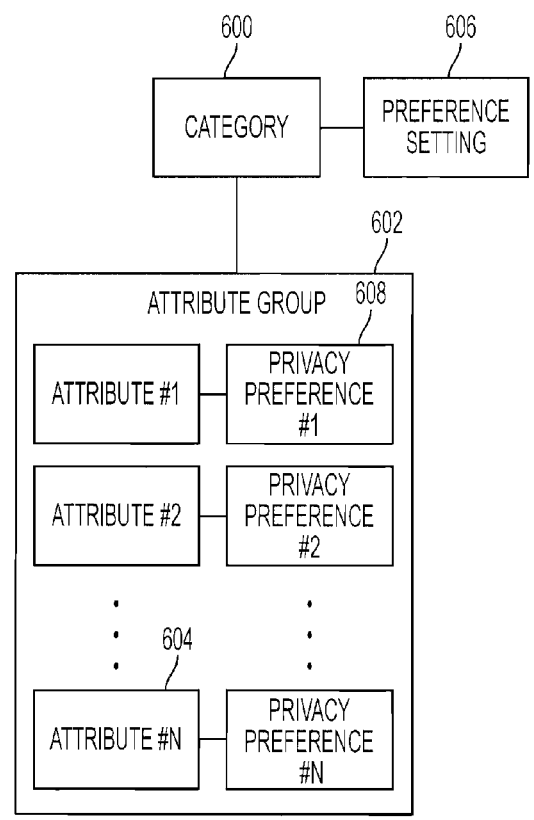

The outcome from the editing functions of FIGS. 7 and 8—creation of a category and populating it with attributes—is a category-based preference scheme, such as shown in FIGS. 6A-B. The FINANCIAL category is created, selected attributes are grouped within it, and a preference is set to the category.

The preference management scheme for implementing the preference selections shown in FIGS. 7-8 is straightforward. Based on a user's selection, the preference is converted into the XML, tags and saved, for example, within a separate filed called category.xml. This processing of the user's selection provides a portability feature, as the user can import and export the privacy preferences along with the card.

Referring to FIG. 6B, an alternate configuration for the category-based preference scheme furnishes each attribute with a respective privacy preference 608, in addition to the category preference 606 that applies in common to all of the attributes grouped under the same category 600. For example, in FIG. 8, the "Select Preference" function can be used to apply a preference to each attribute, e.g., a low, medium, high priority. The per-attribute preference might reflect the importance of each attribute vis-à-vis the desired degree of privacy controls. The category preference 606, then, may be established on the basis of the domain of attribute-specific preferences, so that the category preference reflects the accumulated privacy controls dictated by the attribute-specific preference selections.

Referring to FIG. 9, the preference matrix shows the user privacy preferences for each of the indicated preference levels (row-ordered), as they apply to various privacy practices typical of P3P privacy policies (column-ordered). Each preference level is established with its own implementing ruleset.

Figure 10:
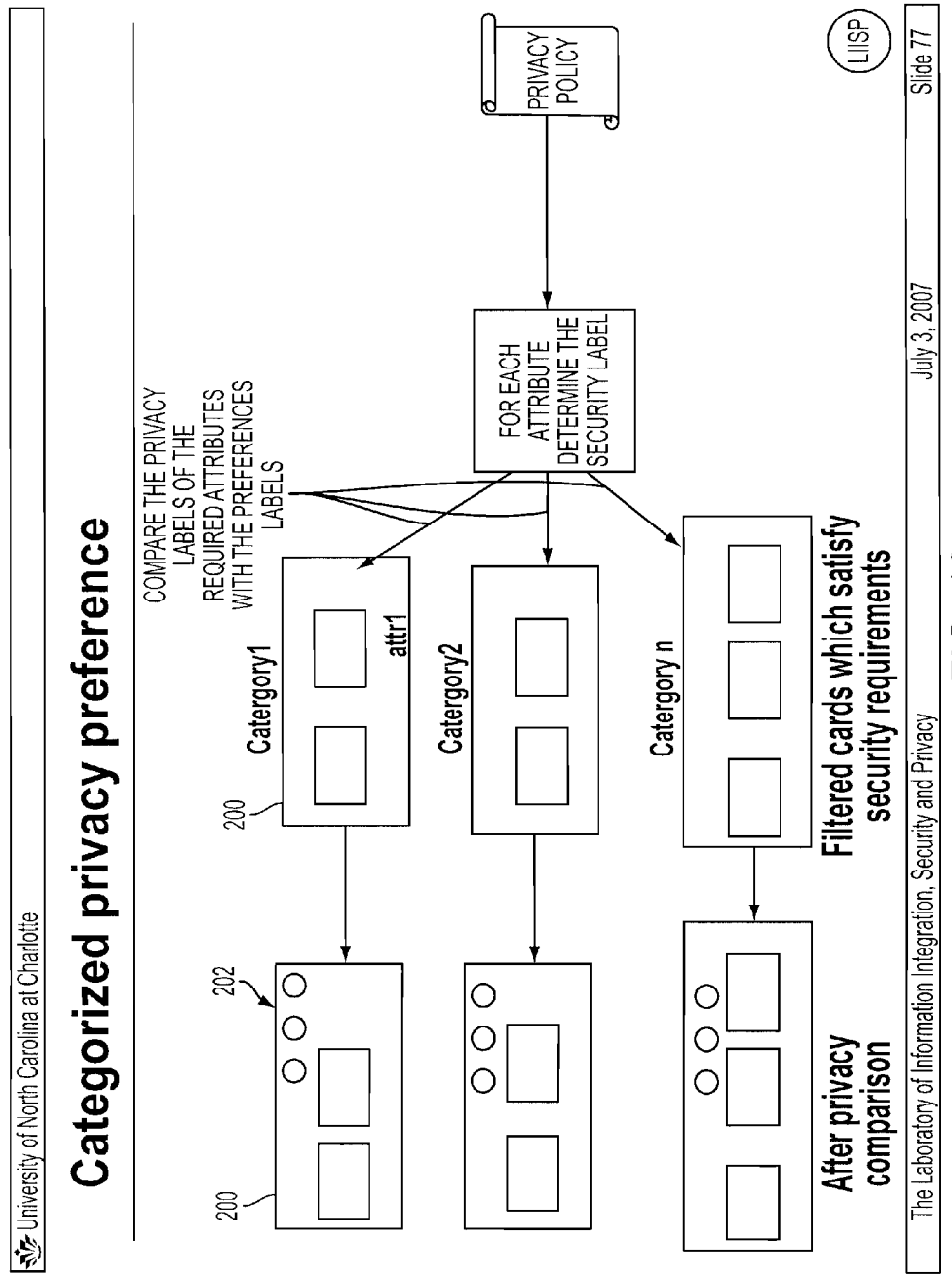
FIG. 10 is a schematic diagram illustrating how the category-based preference strategy of the invention interacts with the filtering mechanism of the identity selector.

Referring to FIG. 10, there is shown a schematic diagram illustrating how the category-based preference strategy interacts with the filtering mechanism of the identity selector. Because the information cards signify user identity attributes, and the attributes are mapped to certain categories (FIG. 6), each information card is thus associated with the preference labels of the categories to which the card attributes belong. Further, each card can be associated with a card-specific preference (FIG. 3).

An incoming security policy is processed by the identity selector, including a determination of the claims required by the policy. These claim requirements specify required attributes that need to be contained in any security token sent to the relying party. The identity selector filters the information cards available to it, in order to determine which information cards satisfy the security policy requirements. The filter operation yields the indicated cards 200.

According to the invention, the preference settings for the categories can be appropriately mapped to the information cards, depending upon the attributes that make up the card. The preference mapping occurs on the basis of the specific set of identity attributes that populate a certain card. Since attributes are grouped into categories having preference labels (FIG. 6), the linkage of a given card attribute to a category produces a similar linkage of the category (and related preference) to the card. The same preference label for a card attribute (i.e., related category) can then be mapped to the card itself. FIG. 10 shows an illustrate set of information cards 200 each having a respective set of attributes and a corresponding privacy preference designation. For example, information card 200 is associated with the preference label Category1, and has attributes attr1 and attr2.

Next, these eligible information cards 200, with the given category designations (and thus preference assignment), are subjected to a privacy policy evaluation. The privacy label for each required attribute is identified. The required attributes are specified by the claim requirements of the security policy. The category assignment for each required attribute is obtained, to determine every category to which the required attribute belongs. Once the relevant categories are identified, the required attributes are then associated with the proper privacy preferences.

Accordingly, the invention provides an efficient mapping mechanism that enables the appropriate privacy preferences, and hence the proper rulesets, to be applied to the privacy policy evaluation process. In this mapping, the identity requirements of the security policy, as expressed by the request for certain claims, specifies the requested user identity attributes. In turn, since the attributes are mapped to categories, and the categories are assigned a privacy preference, each required attribute specifies a category and its associated privacy preference. Identification of the required attributes can thus be used to determine the relevant privacy preference and thereby invoke the appropriate corresponding ruleset.

For each information card 200 that passes the security policy test, the privacy labels of the required attributes (i.e., privacy preference of the category to which it belongs) are preferably compared with the relevant preference labels of the cards (i.e., the card-based preference setting of FIG. 4). This comparison is useful when there is a conflict of the attributes, i.e., the particular attribute is part of more than one category. The card-based preference will be compared to the category-based preferences (as specified by the categories to which the subject attribute belongs) to determine what privacy preference to use.

For each information card 200, a visual indicator of the outcome of the privacy comparison is associated with each card. The user can make decisions about releasing the cards on the basis of these notifications. For example, one approach to prompt the user employs a color-based icon scheme, where red means never (the card should not be released), orange prompts for a mismatch between the privacy policy and the ruleset, and green indicates a match. Any card that does not match is neglected. Referring to FIG. 10, the status of each information card, following the privacy policy evaluation, can be represented by status field 202 having colored icons to represent the match-based results of the evaluation.

The card-based and category-based approaches to privacy preference rule-making each have their own characteristics. In the card-based scheme, the preferences will be applied or assigned to the card as a whole and not for the attributes. In this sense, the card-based preference assignment is relatively agnostic regarding the attributes contained in the card. Each information card is associated with a respective ruleset specified by the preference setting. For this scheme, the privacy control over the card attributes is more gross than fine-grained, since the preference setting is applied on the basis of the card, not the underlying attributes. Accordingly, while a card-based preference might typically be reflective of or commensurate with privacy interests of the underlying attributes, the preference setting nevertheless is specific to the card.

By comparison, in a category-based scheme, the preference is assigned to a category that is populated by attributes. Each attribute is mapped to one of the categories, allowing the user to exercise fine-grained control over the attributes and their preference assignments. In effect, by virtue of its category assignment, each attribute effectively has a preference mapped to it. Additionally, the user can map the preferences settings of the relevant categories, based on the attributes contained in the card, to the information card, making it portable with the card. The implementation for the category-based scheme is user-friendly.

Figure 11:
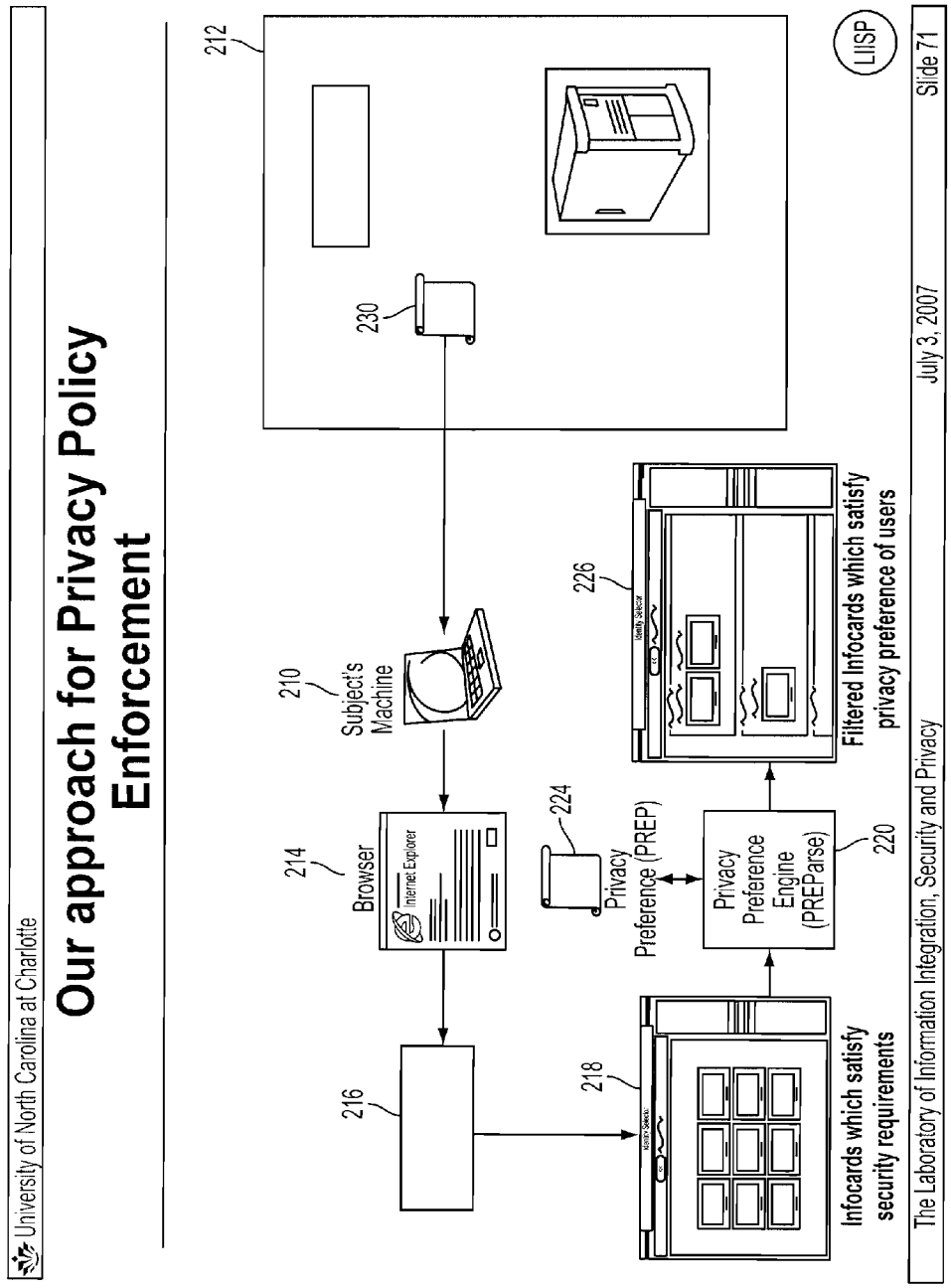
FIG. 11 is a pictorial schematic view of a system implementing the privacy control management of the invention.
Figure 12:
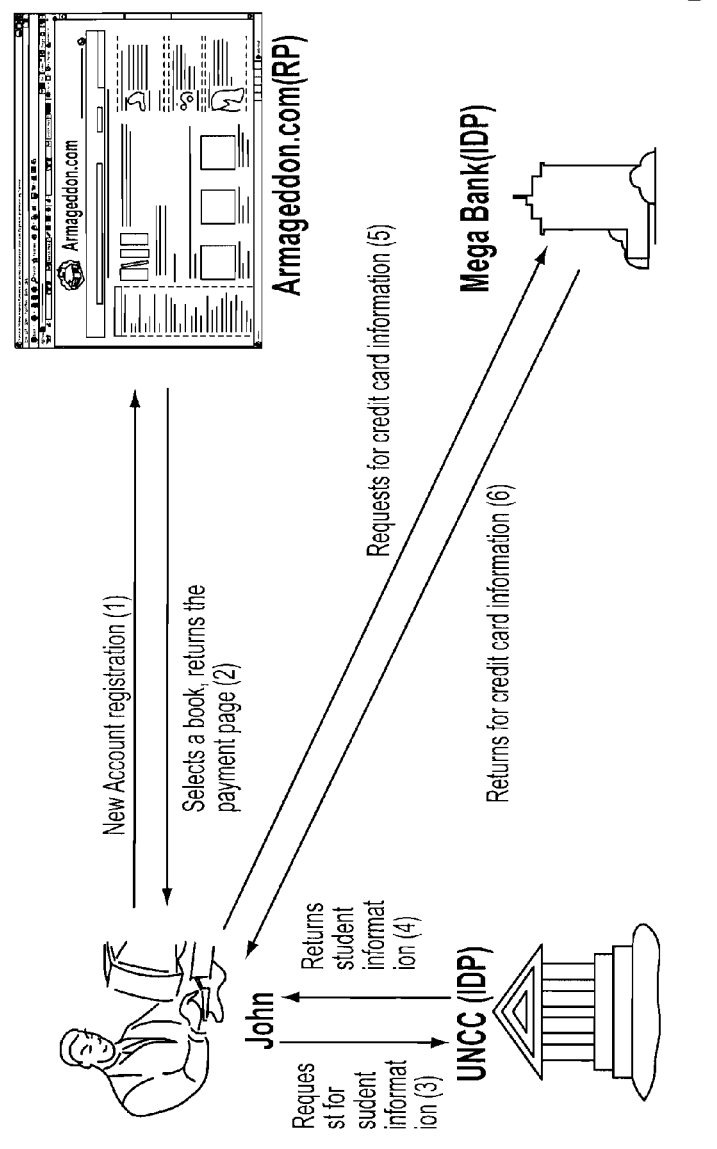
FIG. 12 is a diagrammatic view of an illustrative operating scenario conducted by the system of FIG. 11.
Figure 20:
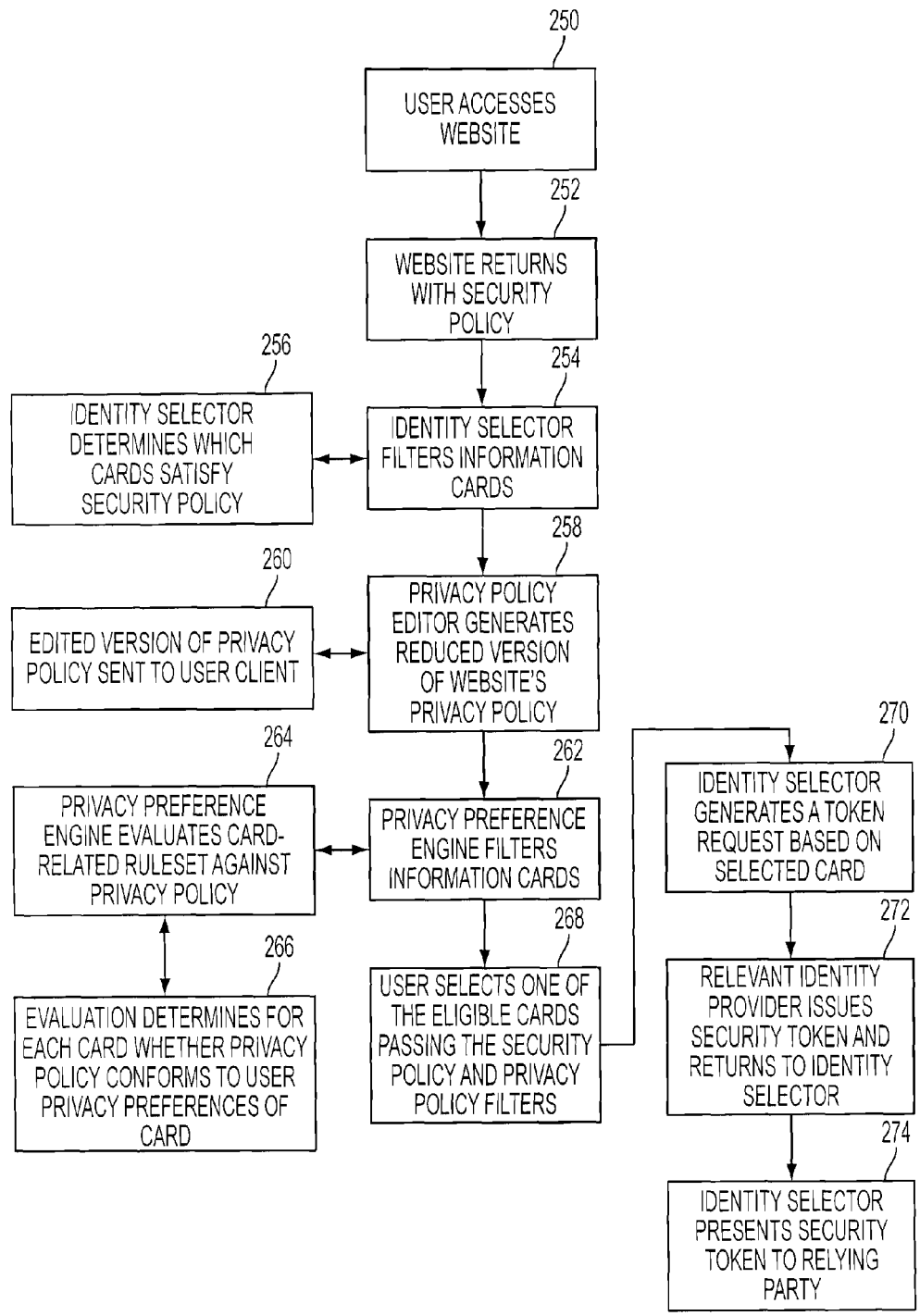
FIG. 20 is a flow diagram, illustrating a process directed to fulfilling security policy identity requirements and exercising user privacy control management, according to the invention.

Reference is now made to FIG. 11, in conjunction with FIGS. 12-17 and 20, to describe one illustrative operating scenario of the invention. In particular, FIG. 11 shows in illustrative form the components and processes that are invoked to process the security policy and to conduct the privacy control management. FIG. 20 is a flow diagram of the process.

A subject machine 210 receives a security policy from a relying party 212 (steps 250, 252). Receipt of the security policy by the browser 214 invokes a process 216 conducted by the identity selector (identity manager 20 of FIG. 1) to determine which information cards satisfy the identity requirements of the security policy. This claim filter determines which information cards have attributes that satisfy the attribute requirements specified in the security policy claim description (steps 254, 256). The identity selector then shows the user, via GUI screen 218, the results of the claim filtering operation. The information cards presented in screen 218 are eligible user identities for purposes of generating a token request based on them. These cards satisfy the security policy requirements.

According to the invention, these eligible cards are further filtered to determine whether the privacy policy of the relying party is acceptable relative to the disclosure of the attribute information signified by the eligible cards. For this purpose, a privacy preference engine 220 (engine 12 of FIG. 1) parses the privacy policy and evaluates the appropriate privacy preference 224 (ruleset 18 of FIG. 1) against the privacy policy (steps 262, 264, 266). The evaluation can be conducted using privacy preferences that are provided according to either a card-based or category-based preference scheme. The evaluation is tailored to the information cards that have been deemed to satisfy the security requirements, i.e., the cards shown in screen 218.

The privacy policy evaluation also conducts a filtering operation, since it determines which information card is further eligible for disclosure, on the basis of whether the privacy preferences pertaining to the card are matched by the privacy policy. Once this evaluation is complete, the identity selector, via GUI screen 226, shows the filtered information cards that satisfy the privacy preference of the user.

A category-based preference scheme is illustratively depicted. In illustrative form, screen 226 shows the two FINANCIAL category cards with a red icon designation, indicating that these cards, even though they satisfy the security requirements, should not be released since the privacy policy fails to match the relevant privacy preferences. Instead, the PERSONAL category card has a green icon designation, indicating that the card can safely be disclosed. The indicated information cards are those, then, that satisfy both the relying party's security policy and the user's privacy preferences. The user can then select the card to submit to the token request process and thereby advance the authentication process (step 268).

The identity selector generates a token request based on the information card selected by the user (step 270). The token request is forwarded to the appropriate identity provider corresponding to the selected information card. The identity provider processes the token request, then issues and returns a security token to the identity selector (step 272). In turn, the identity selector presents the security token to the relying party in fulfillment of the security policy identity requirements (step 274).

The process of FIG. 20 also preferably includes the operation of policy editor 34 (FIG. 1), discussed further below. The policy editor 34 processes the privacy policy of the relying party, and produces a modified or reduced version of the privacy policy (step 258). Editor 34 excises from the original privacy policy all subject matter that does not pertain to privacy practices that relate to the user's privacy concerns involving the disclosure of user identity information. The reduced privacy policy generated by policy editor 34 is forwarded to the client (260). The reduced privacy policy serves as the basis for the privacy policy evaluation conducted by the privacy engine of the user agent.

Referring to FIGS. 12-17, FIG. 12 shows a process flow diagram indicating the flow of messages for one scenario that can be carried out by the system of FIG. 11. The scenario involves multiple identity providers and a single relying party. The user is attempting to perform an online transaction to purchase a book from an online bookstore. The interaction requires a payment information card (e.g., credit card) and a student information card (e.g., student discount). These third-party managed cards are accessible on the platform where the identity selector resides.

Figure 13:
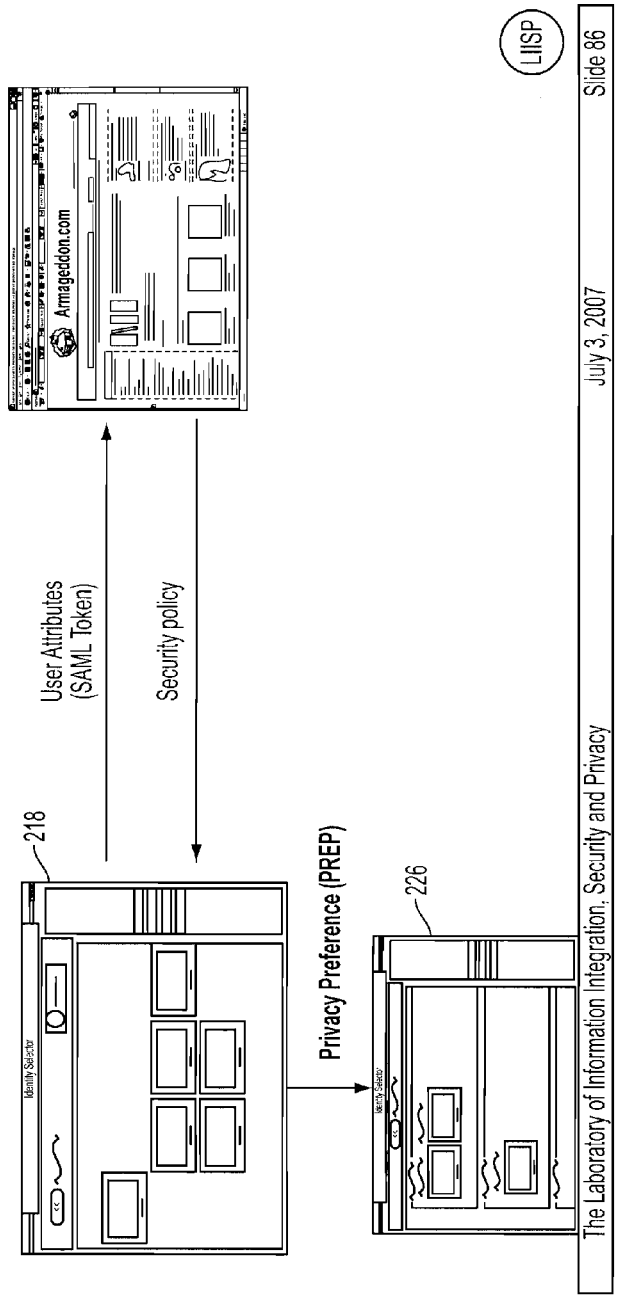
FIGS. 13-14 are diagrammatic views showing the message and process flows attending the operation of FIG. 12 with respect to the use of a self-issued card and a third-party managed card, respectively.

FIG. 13 shows the setup for having the user employ a self-issued card to sign up a new account with the relying party. The user logs into the relying party website using the self-issued card. As in FIG. 11, the identity selector screen 218 shows the cards that satisfy the security policy in reference to the login requirements, while screen 226 shows the cards that pass the privacy policy evaluation. The user then selects the self-issued card to facilitate the login.

Figure 14:
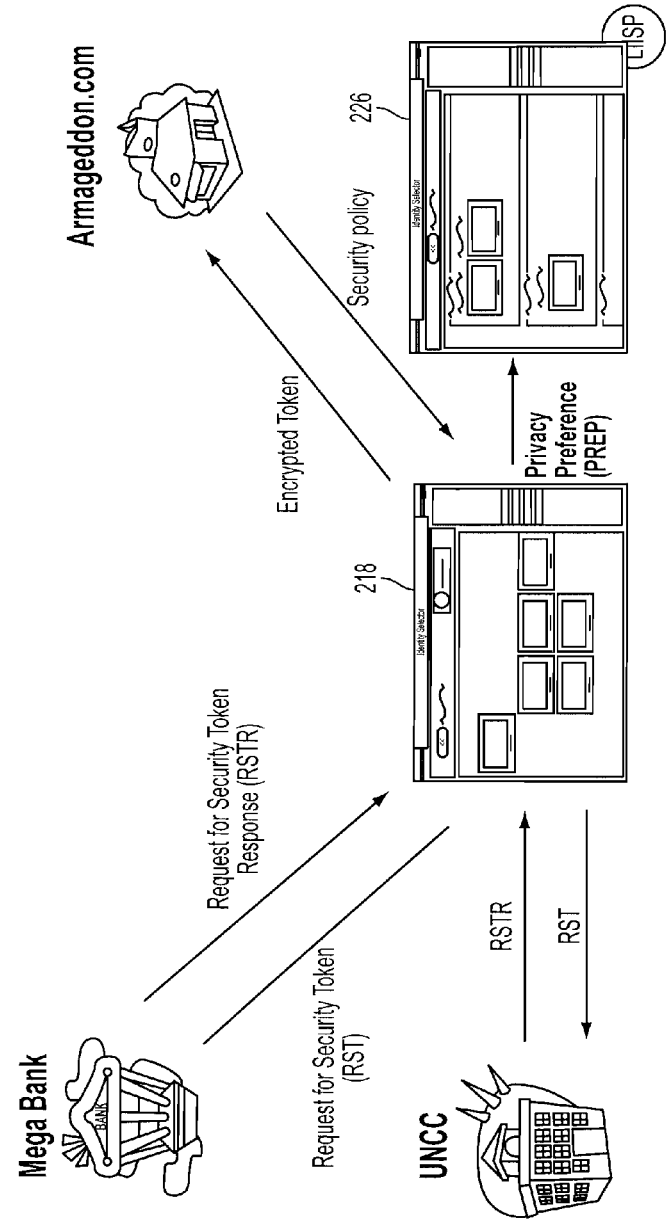

FIG. 14 shows the interaction between the identity selector and the identity providers to request and receive a security token. Like FIG. 13, screens 218 and 226 represent the results of the processes directed, respectively, to determining which cards satisfy the relying party's security policy and which of those cards have privacy preferences matched by the relying party's privacy policy. At the end of the process, an encrypted security token is sent to the relying party.

FIGS. 15-17 show a listing of the operations undertaken to conduct the interactions shown in FIGS. 11-14. In particular, at interaction 3 (FIG. 16), the privacy control management is exercised, which includes parsing the privacy policy to identity the individual privacy practices, matching the privacy policy again the user's privacy preferences, making decisions about the acceptability of the privacy policy on the basis of the matching operation, and sending alerts to the user providing notification of the quality of the privacy policy.

According to another aspect of the invention, in reference to FIG. 1, a privacy policy editor 34 processes the privacy policy of the relying party to produce a reduced or compact version of the privacy policy better suited to the privacy policy evaluation conducted at the client-side by privacy enforcement engine 12. The privacy policy is reduced to include only those privacy practices that relate to the privacy preferences directed to the disclosure of user identity information. All other irrelevant portions of the policy are excised. The privacy enforcement engine 12 is then able to more efficiently process the reduced privacy policy and parse it to identify the salient privacy practices.

The use of privacy policy editor 34 is shown in FIG. 11, as reduced privacy policy 230, and in FIG. 16, as the subject of the policy parsing operation covered by interaction 3. FIG. 18 shows an exemplary listing of a reduced privacy policy generated by privacy policy editor 34. Although privacy policy editor 34 is shown at the server-side in FIGS. 1 and 11, it is also possible to situate this facility elsewhere. For example, editor 34 could be resident on the same platform with the identity selector and privacy management processes. In this form, editor 34 would be configured to receive the relying party's privacy policy, in full, and process it to produce the reduced version then available for use by privacy engine 12. The reduced version of the privacy policy provided by editor 34 basically constitutes a subset of P3P that would be sufficient to examine or meet the privacy requirements of the relying party relative to the disclosure of information card data.

Several variations are possible in the practice of the invention. The processes discussed herein for implementing the privacy enforcement management and control can occur at any stage relative to the security policy analysis performed by the identity selector. For example, as a threshold inquiry, once the identity selector is invoked and even before it initiates a comparison of the information cards to the security policy, the privacy control processes may be executed at the outset. If the privacy policy is deemed acceptable, then the identity selector is allowed to proceed with its normal sequence of operations. Otherwise, the authentication process is halted.

Alternatively, the privacy controls may be exercised intermediately following the point when the user has made the selection of an information card and the identity selector is poised to generated a token request. The privacy control process can intervene after the identity selection, so that further action by the identity selector to issue the token request is pending the outcome of the privacy control process. Again, if the privacy policy is deemed acceptable, then the identity selector is allowed to resume operation.

Further, the privacy controls may be exercised at a more remote time, such as following receipt of the security token issued by the identity provider but before the security token is presented to the relying party by the identity selector. If the privacy policy is deemed acceptable, then the security token can be released to the relying party to advance the authentication process.

Additionally, the privacy controls may be exercised on a per-card basis, particularly in regard to the cards deemed to satisfy the identity requirements of the security policy. For example, depending upon the transactional context and the nature of the specific interaction that calls for authentication, the invention may offer different privacy controls for different cards based on the sensitivity of the information pertaining to the cards. For example, potential disclosures of information having varying degrees of sensitivity vis-à-vis expected privacy protections will be addressed by proportionally measured privacy preferences to circumscribe the privacy expectations. For this purpose, the preferences editor of the invention allows the user to formulate privacy preferences, in the form of corresponding rulesets, that are card-specific and card-correlated. Thus, when the enforcement engine conducts the rules evaluation relative to a certain card, it applies the ruleset associated with that card.

Any means known to those skilled in the art can be used to implement user agent 10 and identity manager 20. For example, as a client program, the identity manager 20 can be configured to include and otherwise implement user agent 10, which itself is a client program. In general, user agent 10 and identity manager 20 are resident on a common host computing system 8 that the user engages and otherwise interacts with to access web services and resources from internet environment 28. Preferably, identity manager 20, and specifically identity selector 22, can be modified or otherwise adapted to integrate the privacy management modules of user agent 10. The privacy control process could then be readily and efficiently coordinated with the filtering of information cards relative to processing of the security policy.

Figure 19:
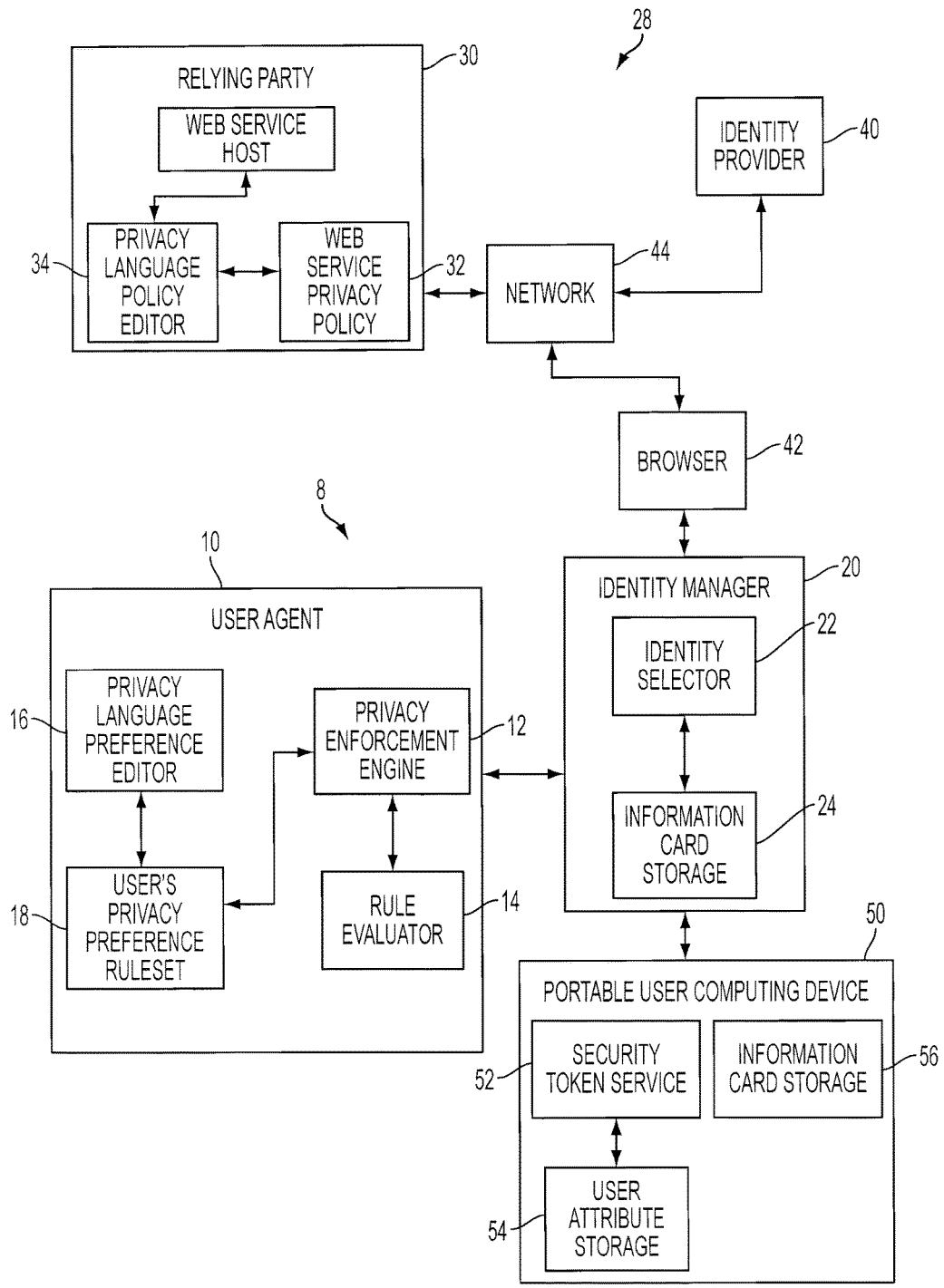
FIG. 19 is a block diagram illustration of a privacy management system for use in a user-centric identity management system in combination with a user-portable personal security device, according to another embodiment of the invention.

The use of the invention can be further enhanced in connection with the user-centric identity management system described in FIG. 19. The invention can be extended for use with an identity management system in combination with a user-portable device 50 combining both an onboard security token issuer and an information card storage. A user-portable, personal security device 50, implemented in one form as a Java-powered iButton smart card, integrates into a single common platform a security token service (STS) 52 for issuing tokens, a storage 54 containing user attributes used by the STS to compose the claim assertions of the security token, and a storage 56 containing a portfolio of user identities in the form of information cards. The system of FIG. 19 provides privacy control management over any proposed disclosure of a user identity, which is developed from the combination of the identity selector 22 and the user-portable personal security device 50.

The user device 56 features a plug-in capability allowing it to connect to the user host machine (identity manager 20). Accordingly, the identity selector 22 resident on the host machine can access the information cards on the user device and use them in the same manner as the managed cards resident with the identity selector. If an information card imported from the user device is chosen for use in the authentication process, the identity selector sends an appropriate token request to the user device. The STS in the user device issues a security token in response to the token request, so that the user device effectively operates as an identity provider. The identity selector receives the issued security token from the user device, and uses it to respond to the request for a security token. In particular, the identity selector presents the security token to the relying party in proposed satisfaction of the identity requirements specified by the security policy.

According to the invention, the user can exercise privacy control management over the disclosure of any user identities that are based on the information cards stored on the user device and the security tokens issued by the STS resident on the user device. The manner of privacy control is similar to that discussed in connection with FIG. 1.

The user portable device 50 is disclose in the co-pending applications indicated above in the Cross-Reference to Related Applications section herein.

Reference materials include the documents: "The Platform for Privacy Preferences 1.0 (P3P1.0) Specification, W3C Recommendation 16 Apr. 2002," with the latest version found at http://www.w3.org/TR/P3P/; and "A P3P Preference Exchange Language 1.0 (APPEL1.0), W3C Working Draft 15 Apr. 2002," with the latest version found at http://www.w3.org/TR/P3P-preferences, both incorporated herein by reference thereto.

While this invention has been described as having a preferred methodology and design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A system, comprising:
   storage including at least one privacy preference relative to at least one user identity;
   an editor, responsive to user selections that indicate at least one preference-related input that relates to the at least one user identity, the editor to:
   generate at least one privacy preference based on the user selections wherein the user identity is represented by at least one information card used in an online transaction with a relying party; and
   determine a privacy preference for each category;
   an engine, operatively connected to the storage, the engine configured to perform an evaluation using the at least one privacy preference of any category that references at least one required attribute; and
   a host computer to evaluate the at least one privacy preference against a privacy policy associated with the online transaction and obtained from the relying party;
   wherein the host computer provides the at least one information card that represents the user identity to the relying party.

2. The system of claim 1, wherein the editor enables execution of a process to define at least one category, and populate each category with a respective group of user identity attributes.

3. The system of claim 2, wherein the engine performs the evaluation using the privacy preference of any category that references the at least one required attribute responsive to an indication of at least one required attribute as specified in the security policy requirements.

4. The system of claim 1, wherein the editor enables execution of a process to receive from an identity manager at least one indication of the at least one information card each representative of a user identity, and determines a privacy preference for the at least one information card.

5. The system of claim 4, wherein the engine performs the evaluation using the privacy preference of the at least one information card determined by the identity manager to satisfy the security policy requirements, in response to an indication of the determination from the identity manager.

6. A method, comprising:
   a user agent providing at least one privacy preference relative to at least one user identity;
   the user agent receiving user selections indicating at least one privacy preference-related input pertaining to the user identity wherein the user identity is represented by at least one information card used in completing an online transaction with a relying party;
   the user agent generating at least one privacy preference, using the user selections;
   the user agent furnishing the at least one generated privacy preference;
   the user agent evaluating at least one privacy preference against a privacy policy associated with an online transaction and obtained from the relying party, the evaluating using the at least one privacy preference of any category referencing at least one required attribute; and
   a host computer providing the at least one information card representing the user identity to the relying party.

7. The method of claim 6, further comprises the user agent conducting a process to define at least one category, populate each category with a respective group of user identity attributes, and determine a privacy preference for each category.

8. The method of claim 7, further comprises:
   the user agent processing an indication of at least one required attribute as specified in the security policy requirements; and
   the user agent evaluating further includes evaluating the privacy preference of any category referencing the at latest one required attribute.

9. The method of claim 6, further comprises the user agent conducting a process to receive from an identity manager at least one indication of the at least one information card each representative of a user identity, and to determine a privacy preference for the at least one information card.

10. The method of claim 9, further comprises the user agent evaluating further includes evaluating the privacy preference of the at least one information card determined by the identity manager to satisfy the security policy requirements.

11. The method of claim 6, further comprises:
the user agent processing an indication from an identity manager specifying the user identity determined to satisfy the security policy requirements; and
the user agent evaluating further includes evaluating, in accordance with the indication, the privacy preference of the user identity specified in the determination.

12. The method of claim 6, further comprises the user agent determining an acceptability of the privacy policy, using the evaluation.

13. The method of claim 12, further comprises the user agent determining further includes determining the acceptability on a per user identity basis, relative to the user identities associated with the at least one privacy preference used in the evaluation.

14. A non-transitory computer-readable medium having computer-executable instructions for execution by a processor, that, when executed, cause the processor to:
provide, via a user agent, at least one privacy preference relative to the user identity wherein the user identity is represented by at least one information card used in completing an online transaction with a relying party;
receive, via the user agent, user selections indicating at least one privacy preference-related input pertaining to at least one user identity;
generate, via the user agent, at least one privacy preference, using the user selections;
furnish, via the user agent, the at least one generated privacy preference;
evaluate, via the user agent, at least one privacy preference against a privacy policy associated with the online transaction and obtained from the relying party, the evaluation using the at least one privacy preference of any category referencing at least one required attribute; and
provide, by a host computer, the at least one information card that represents the user identity to the relying party.

15. The non-transitory computer-readable medium of claim 14, wherein the instructions further cause the processor to:
process, via the user agent, an indication from an identity manager specifying the user identity determined to satisfy the security policy requirements; and
cause the evaluation operation to evaluate, in accordance with the indication, the privacy preference of the user identity specified in the determination.

16. The non-transitory computer-readable medium of claim 14, wherein the instructions further cause the processor to conduct, via the user agent, a process to define at least one category, populate each category with a respective group of user identity attributes, and determine a privacy preference for each category.

17. The non-transitory computer-readable medium of claim 16, wherein the instructions further cause the processor to:
process, via the user agent, an indication of at least one required attribute as specified in the security policy requirements; and
cause the evaluation operation to evaluate the privacy preference of any category referencing the at latest one required attribute.

18. The non-transitory computer-readable medium of claim 15, wherein the instructions further cause the processor to conduct, via the user agent, a process to receive from the identity manager at least one indication of the at least one information card each representative of a user identity, and to determine a privacy preference for the at least one information card.

19. The non-transitory computer-readable medium of claim 18, wherein the instructions further cause the processor to cause the evaluation operation to evaluate the privacy preference of the at least one information card determined by the identity manager to satisfy the security policy requirements.

20. The non-transitory computer-readable medium of claim 15, wherein the instructions further cause the processor to determine an acceptability of the privacy policy, using the evaluation.

* * * * *